United States Patent [19]

Hayashi et al.

[11] Patent Number: 5,574,563
[45] Date of Patent: Nov. 12, 1996

[54] METHOD AND APPARATUS FOR FORMING IMAGES AT DIFFERENT DEGREES OF RESOLUTION

[75] Inventors: Kimiyoshi Hayashi, Souka; Kazuhiko Hirooka, Tokyo, both of Japan

[73] Assignee: Canon Kabushiki Kaisha, Tokyo, Japan

[21] Appl. No.: 471,159

[22] Filed: Jun. 6, 1995

Related U.S. Application Data

[62] Division of Ser. No. 165,550, Dec. 13, 1993, which is a continuation of Ser. No. 519,441, May 4, 1990, abandoned.

[30] Foreign Application Priority Data

| May 10, 1989 | [JP] | Japan | 1-115140 |
| May 10, 1989 | [JP] | Japan | 1-115141 |
| May 10, 1989 | [JP] | Japan | 1-115142 |
| May 10, 1989 | [JP] | Japan | 1-115143 |
| May 10, 1989 | [JP] | Japan | 1-115144 |

[51] Int. Cl.$^6$ .............. H04N 1/23; H04N 1/29; H04N 1/40; G01D 15/14
[52] U.S. Cl. .............. 358/296; 358/298; 358/300; 347/131; 347/251
[58] Field of Search .................. 358/296, 298, 358/300, 448, 530, 534; 395/109, 112, 128; 347/129, 131–133, 224, 225, 232, 251–254

[56] References Cited

U.S. PATENT DOCUMENTS

| 4,347,523 | 8/1982 | Ohara | 358/298 X |
| 4,870,499 | 9/1989 | Suzuki et al. | 358/298 X |
| 4,969,053 | 11/1990 | Outa et al. | 358/298 X |
| 4,989,098 | 1/1991 | Arimoto | 358/298 X |
| 5,258,780 | 11/1993 | Ema et al. | 358/298 X |

FOREIGN PATENT DOCUMENTS

62-47269  2/1987  Japan .............. H04N 1/38

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing apparatus connected with an image forming apparatus which forms an image at different degrees of resolution inputs image data from an external source and generates a control signal to control the degree of resolution at which the image forming apparatus forms the image from the image data. The control signal is a signal to control a driving power of the image forming apparatus. The image data input by the input means is output to the image forming apparatus, along with the control signal.

14 Claims, 18 Drawing Sheets

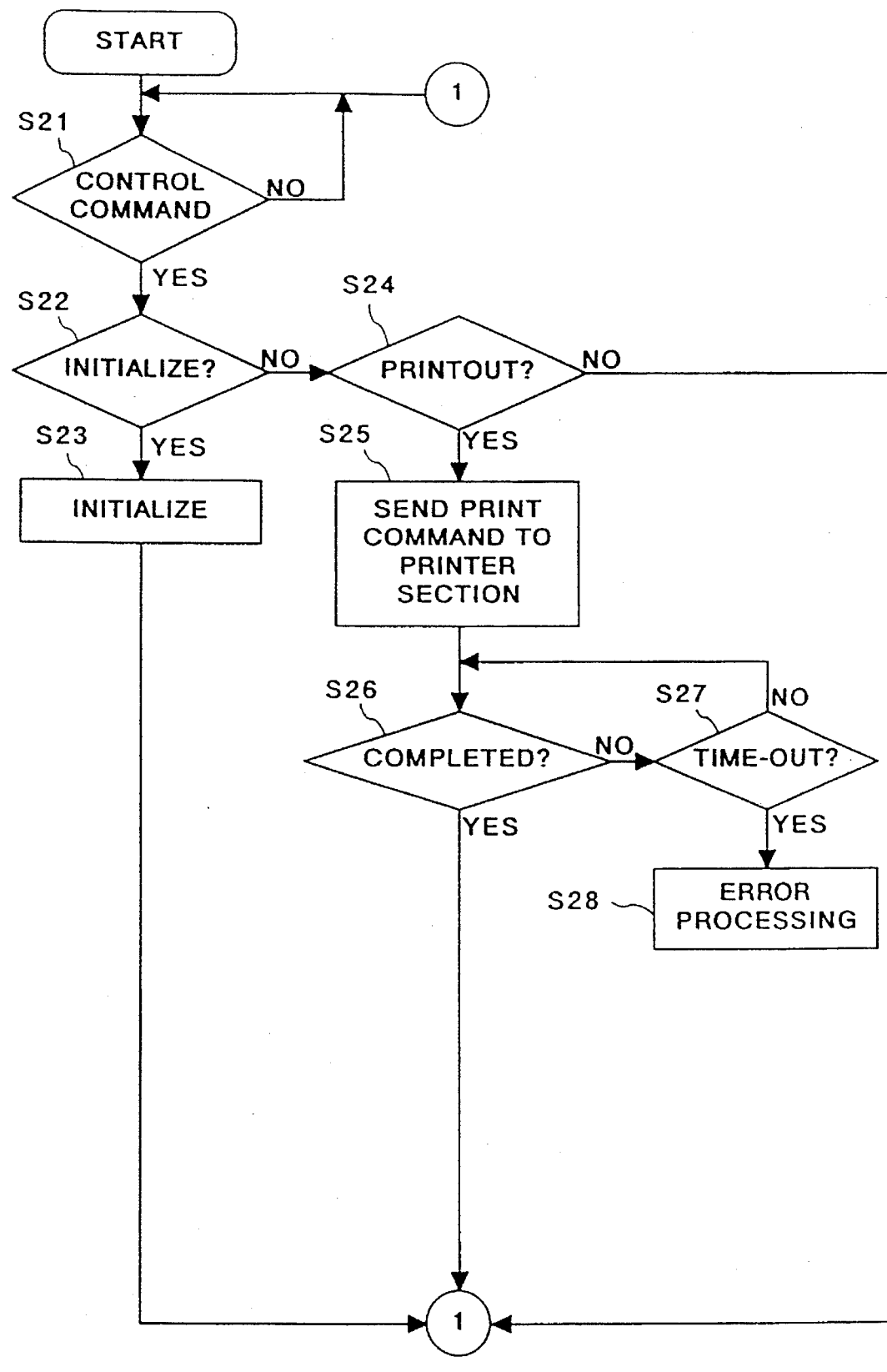
F I G. 3B

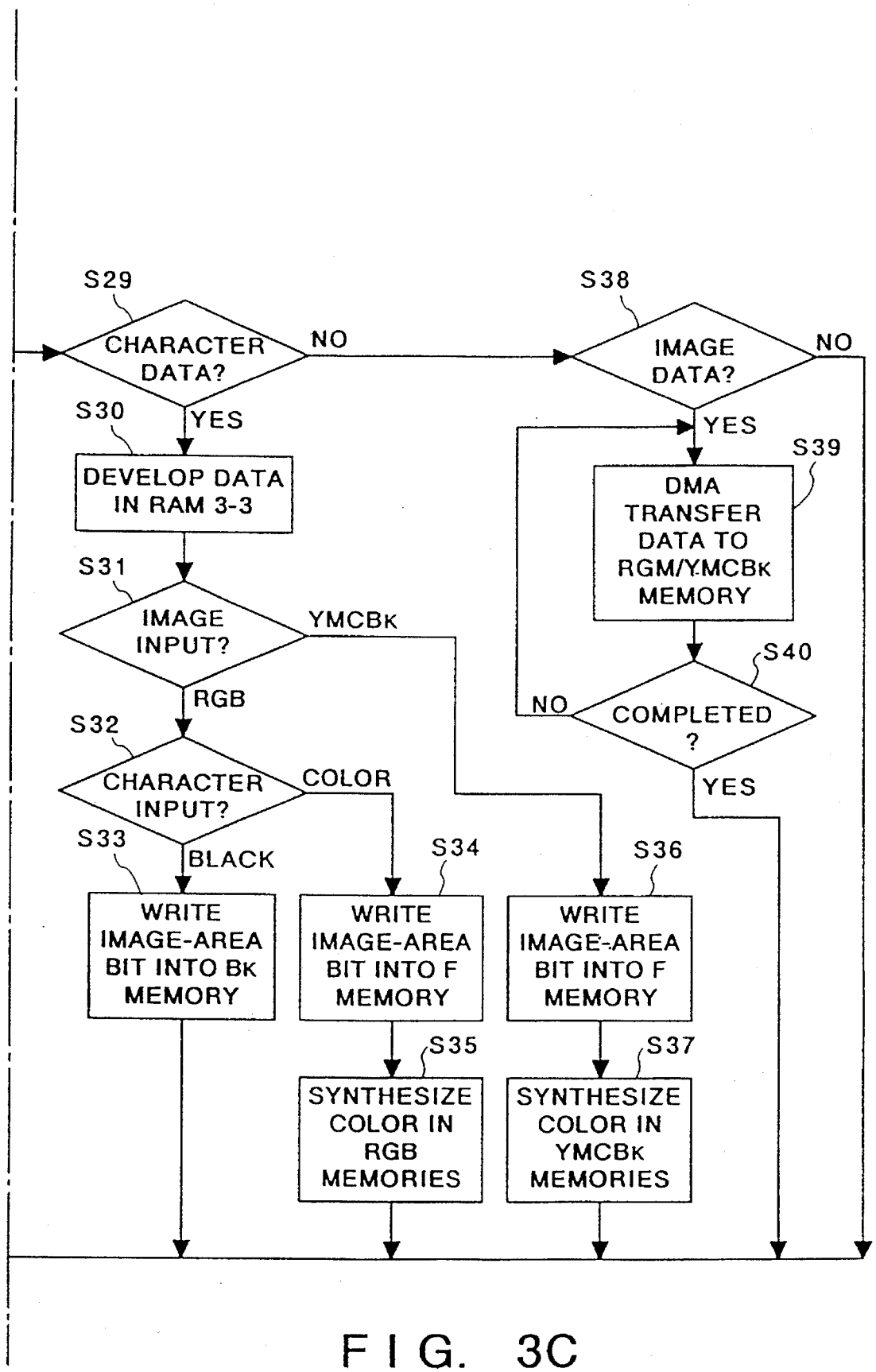
F I G. 3C

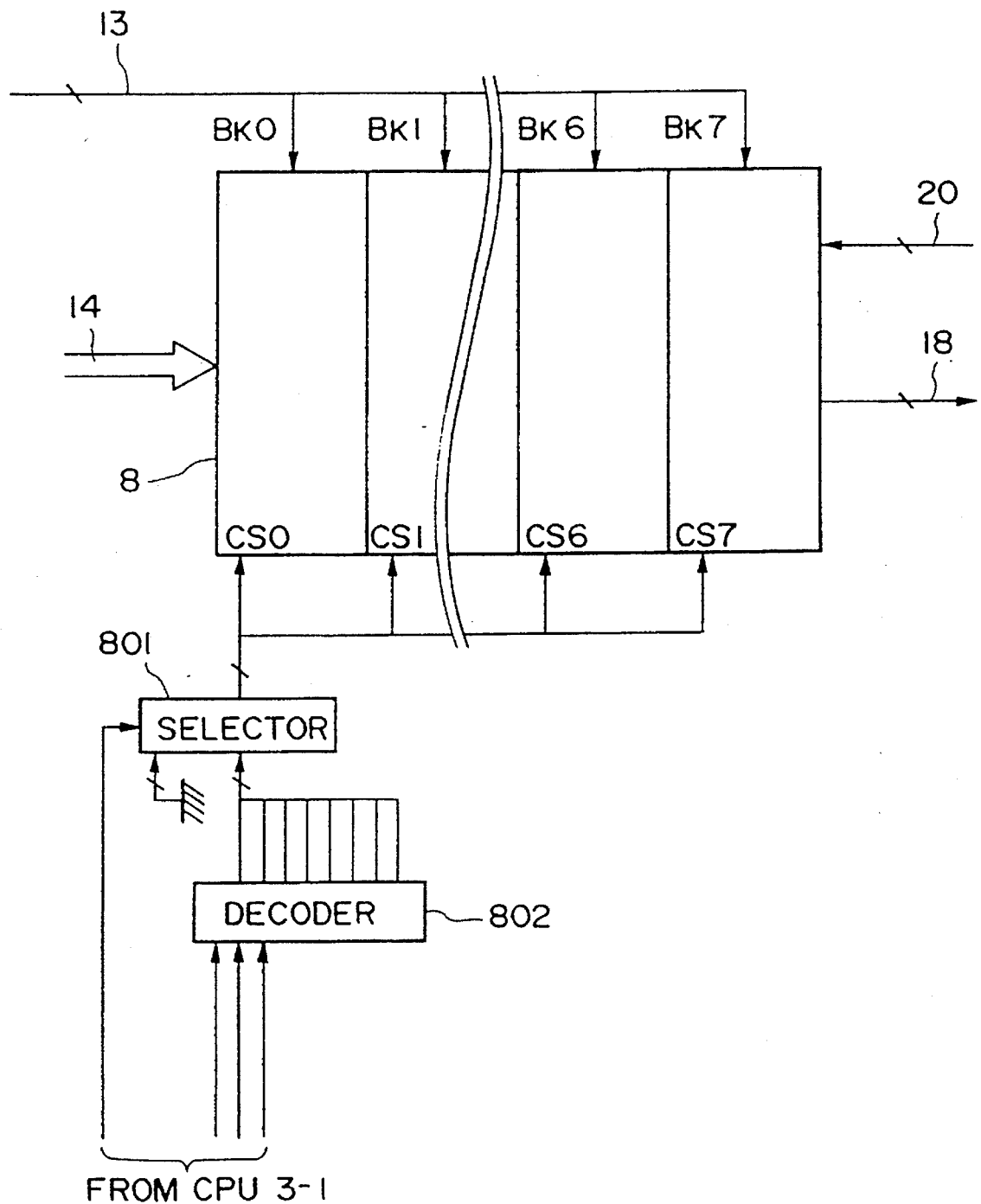
F I G. 4

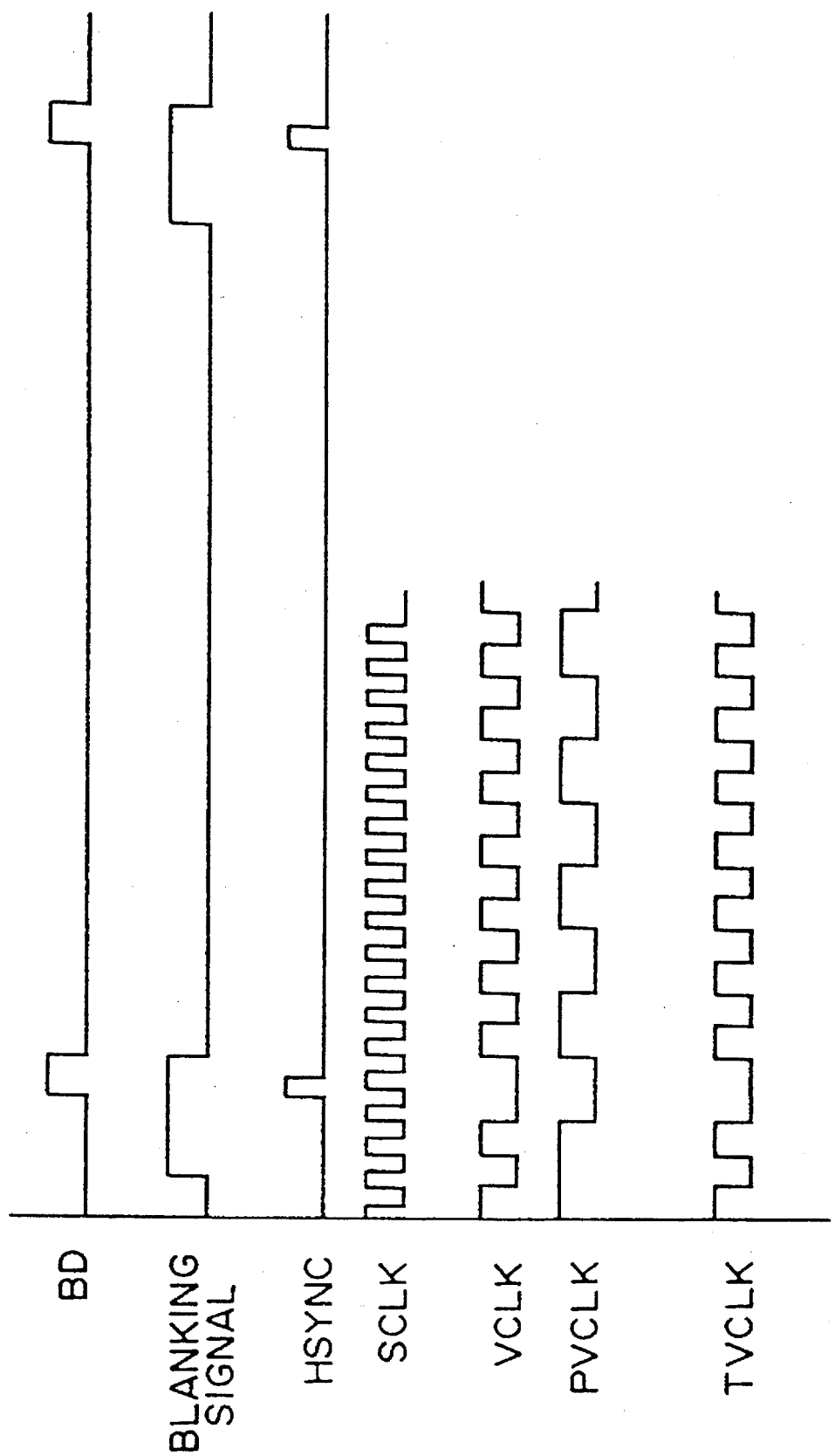

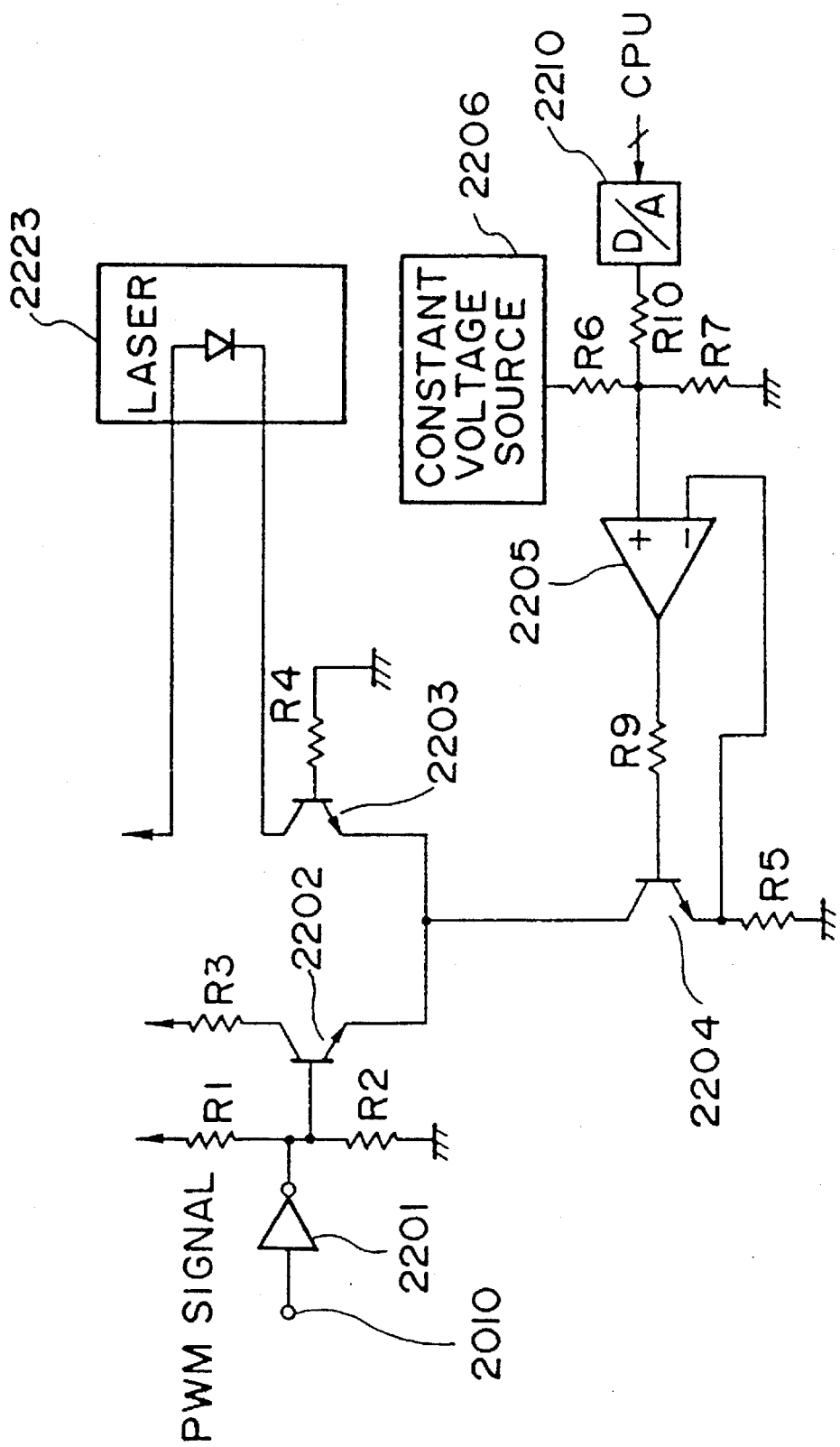
F I G. 13

METHOD AND APPARATUS FOR FORMING IMAGES AT DIFFERENT DEGREES OF RESOLUTION

This application is a continuation division of application Ser. No. 08/165,550 filed Dec. 13, 1993, pending, which is a continuation of application Ser. No. 07/519,441 filed May 14, 1990, abandoned.

BACKGROUND OF THE INVENTION

1. Field of the Invention

The present invention relates generally to image forming apparatus and, more particularly, to an image forming apparatus capable of forming an image containing a natural image such as a photographic image and a line drawing such as a character or a figure by utilizing degrees of resolutions.

2. Description of the Related Art

Conventional apparatus of this kind are typically arranged to produce an image output in which there exist a natural image and a line image by causing the resolution of the natural image to differ from that of a line image by an image-area separating method or in accordance with a command given by a central processing unit (CPU). However, more demands will be placed on an arrangement capable of synthesizing independent images which are represented in different steps of tone representation—a natural image and a line image.

A typical example of such an arrangement is an electrophotographic type of laser beam printer (LBP). The laser beam printer (LBP) is arranged to reproduce a natural image, a line image or the like by converting input image data into two-level signals (PWM signals, dither signals and so on) in accordance with the density represented by the image data.

However, the conventional arrangement has a number of problems. For example, it is necessary to perform the extra step of separating a synthesized image prepared in a host system into image areas within a printer system.

If separation into image areas is to be performed in the printer system, it is necessary to carry out complicated image-area separation in the printer system or image-area separation must be controlled within a limited range by utilizing the CPU of the printer system.

Although it is possible to easily synthesize a natural image and a line image whose numbers of steps of tone representation materially differ from each other, it will be difficult to achieve satisfactory image-area separation with respect to images having close numbers of steps of tone representation.

In addition, general LBPs are arranged to drive laser light with constant power irrespective of the nature of each image. For this reason, it is difficult to faithfully reproduce the nature of various kinds of images (the tone representation of natural images, the sharpness of character images or the like).

SUMMARY OF THE INVENTION

It is therefore a first object of the present invention to provide an image forming apparatus (or a novel interface) which is capable of forming one high-quality image from images whose number of steps of tone representation differ from each other, for example, a multi-level image and a two-level image such as characters.

To achieve the above object, according to the present invention, there is provided an image forming apparatus which is arranged to form one image by synthesizing images which differ in the number of steps of tone representation and by selectively controlling resolution corresponding to the tone of representation.

It is a second object of the present invention to provide an image forming apparatus which is capable of controlling resolution with high accuracy by means of a simple arrangement.

To achieve the above object, according to the present invention, there is provided an image forming apparatus which has an arrangement for externally inputting a control signal for selectively controlling different degrees of resolution.

It is a third object of the present invention to provide an image forming apparatus capable of forming an image faithful to the nature of an original image.

To achieve the above object, according to the present invention, there is provided an image forming apparatus which has an arrangement which varies the level of driving power in accordance with the degree of resolution.

Further, it is other object of the present invention to provide a novel interface preferable for a color laser beam printer (a color LBP) and a color LBP having the new interface.

The above and other objects, features and advantages of the present invention will be apparent from the following description of a preferred embodiment of the invention with reference to the accompanying drawings.

BRIEF DESCRIPTION OF THE DRAWINGS

FIG. 1, comprising

FIGS. 3A, 3B and 3C are flow charts of the control sequence executed by the control section of the embodiment;

FIG. 4 is a block diagram showing the Bk memory of the embodiment;

FIG. 10 is a timing chart showing primary signals used in the embodiment;

FIG. 13 is a circuit diagram showing a second example of the laser driver of the embodiment.

DESCRIPTION OF THE PREFERRED EMBODIMENT

A preferred embodiment of the present invention will be exampled in detail below with reference to the accompanying drawings.

Arrangement of Color LBP

Figure 2:
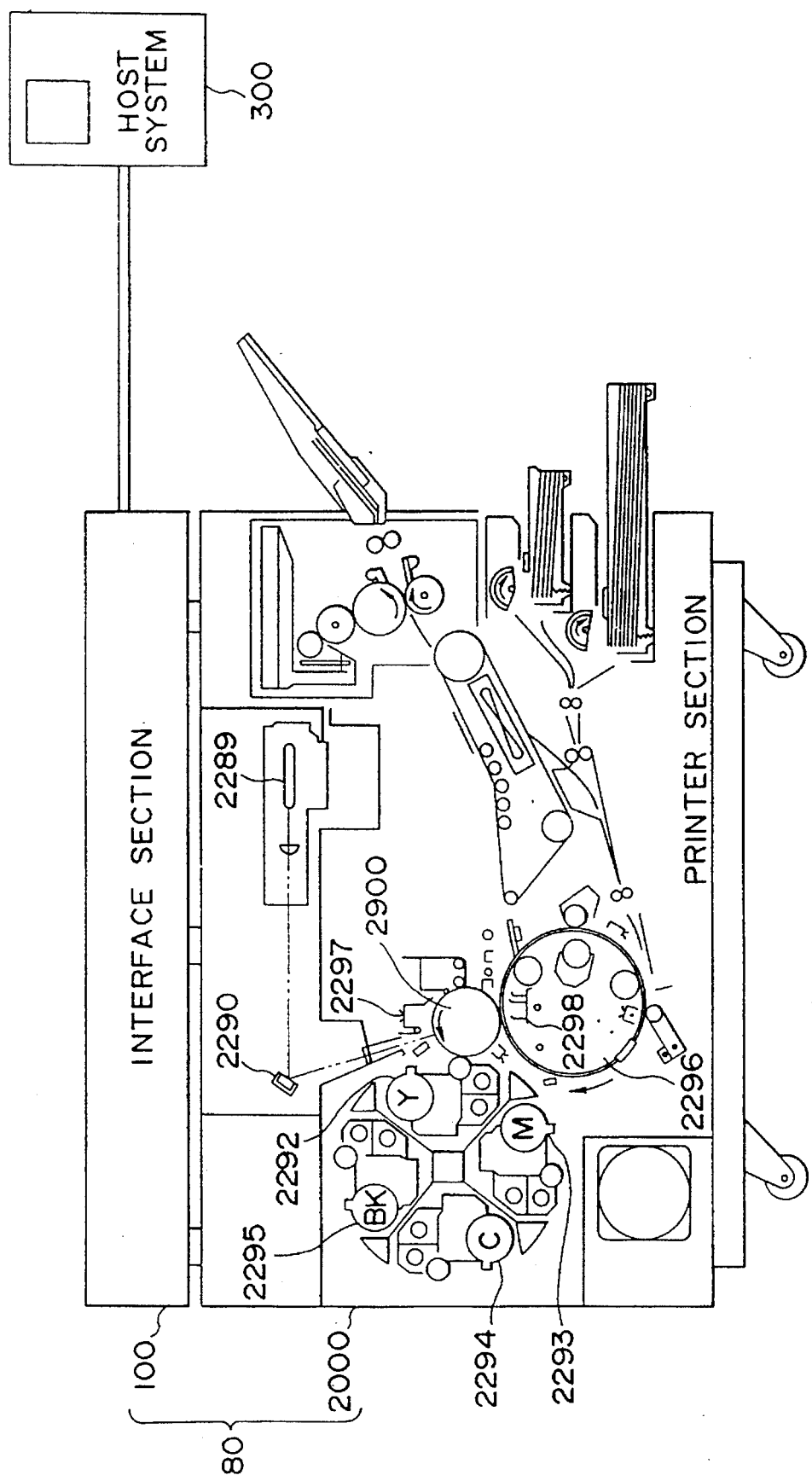
FIG. 2 is a schematic cross-sectional view showing the printer mechanism of the color LBP according to the preferred embodiment of the present invention.

FIG. 2 is a schematic cross-sectional view showing the printer mechanism of a color laser beam printer (color LBP) according to the preferred embodiment. In a printer section 2000, a laser beam, emitted from a laser device (not shown), scans a mirror 2290 in the main-scan (horizontal-scan) direction at high speed by a polygon mirror 2289. The laser beam is reflected by the mirror 2290 and scans a photosensitive drum 2900 on a line-dot exposure basis at a maximum resolution of 16 lines/mm with the photosensitive drum 200 uniformly charged by a charger 2297. In the presently preferred embodiment, one horizontal scanning length of the laser beam corresponds to that of image information. Since the photosensitive drum 2900 is rotating at a constant speed in the direction of the arrow shown on the drum 200 in FIG. 2, a flat image (latent image) is formed. If the photosensitive drum 2900 is exposed to a laser beam which conveys yellow image data, the resulting latent image is developed by a yellow (Y) developing device 229 and transferred onto paper wrapped around a transfer 2296. A similar operation is repeated for individual image data corresponding to magenta (M), cyan (C) and black (Bk), whereby the images of the respective colors are superposed to form one full-color image.

Figure 1A:
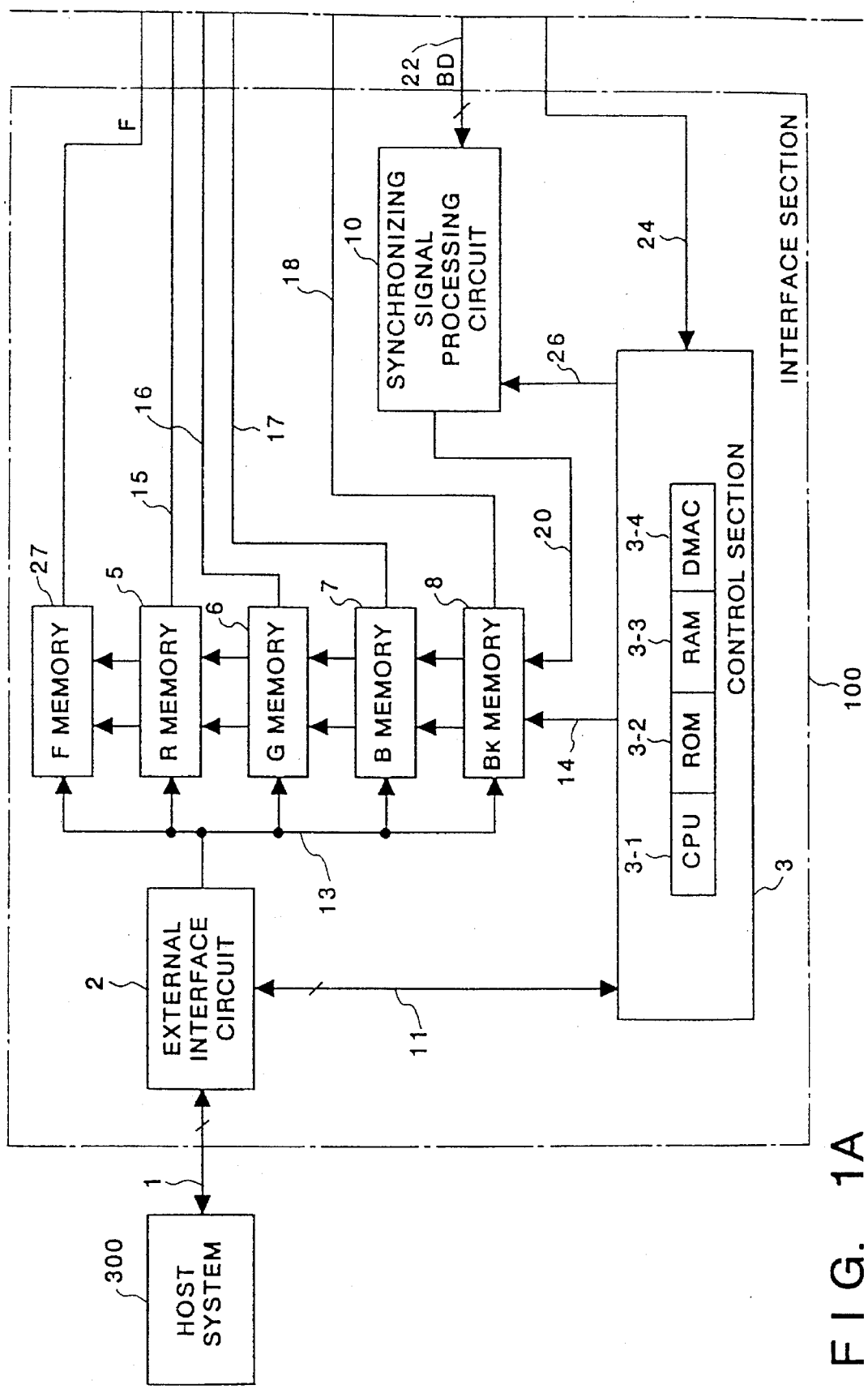
FIGS. 1A and 1B is a block diagram showing a color laser beam printer (color LBP) according to a preferred embodiment of the present invention.
Figure 1B:
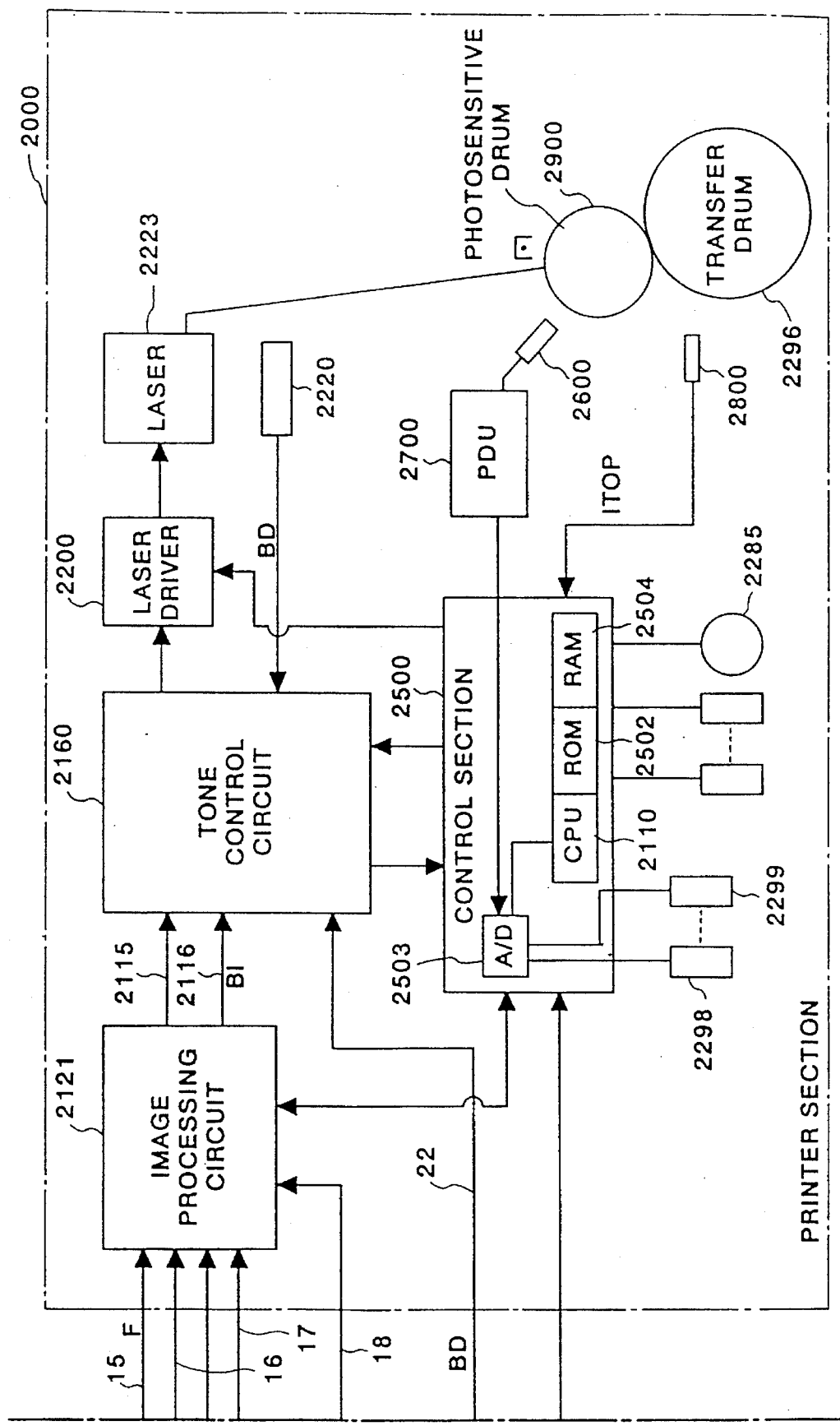

FIG. 1 is a block diagram showing the color LBP 80 used in the embodiment. The color LBP 80 of the embodiment comprises an interface section 100 and the printer section 2000.

The interface section 100 includes an external interface circuit 2 which is connected to a host system 300 by a cable 1 so that control information and image data are communicated therebetween. The interface section 100 also includes a control section 3 which is arranged to interpret and execute various kinds of control commands which are transferred through the external interface circuit 2, and also to provide control over image memories as will be explained later. The control section 3 includes a CPU 3-1, a ROM 3-2, a RAM 3-3 and a direct memory access controller (DMAC) 3-4. The CPU 3-1 serves as the main control unit of the control section 3. The ROM 3-2 stores a control program, such as that shown in FIGS. 3A, 3B and 3C, to be executed by the CPU 3-1. The ROM 3-2 also stores a font table which is used to convert character code data into character pattern data. The RAM 3-3 temporarily stores various data such as character data transferred from a host system 300 and also serves as a work area for the CPU 3-1. The DMAC 3-4 transfers color image data to corresponding image memories 5–8 by a DMA process under the control of the CPU 3-1. The image memories 5–8 store the respective color image data derived from a predetermined color separating process. For example, the R memory 5 stores red (R) or cyan (C) image data, the G memory 6 green (G) or magenta (M) image data, and the B memory 7 blue (B) or yellow (Y) image data. The BK memory 8 stores black (BK) image data or a character pattern data (two-level data) developed by the CPU 3-1. If other image data are synthesized with the image data stored in the image memories 5–8, an F memory 27 stores the position where this systhesis has been occurred. A synchronizing signal processing circuit 10 is arranged to operate in synchronization with a synchronizing signal supplied from the printer section 2000 so that the image data of the respective image memories 5–8 are read out and transferred to the printer section 2000.

The printer section 2000 includes an image processing circuit 2121 which converts the input R, G and B data into Y, M, C and BK data as required. A tone control circuit 2160 causes each of the Y, M, C and BK data to correspond to the density of a predetermined color representation usable in the printer section 2000, and effects pulse-width modulation (PWM) conversion of each color data in accordance with the color-representation density. The printer section 2000 also includes a laser driver 2200 which is arranged to drive a laser device 2223 in accordance with the video signal output from the tone control circuit 2160, and a control section 2500 for controlling the printer section 2000. The control section 2500 also exchanges information with the control section 3 over a control line 24. The control section 2500 comprises a CPU 2110, a ROM 2502 and a RAM 2504. The CPU 2110 serves as the main control unit of the control section 2500. The ROM 2502 stores a control program (for example, a part of that shown in FIG. 6) to be executed by the CPU 2110. The RAM 2504 is used as a work area by the CPU 2110. A potential sensor 2600 is arranged to measure the amount of charge stored on the photosensitive drum 2900, and a potential measurement unit (PDU) 2700 amplifies the output of the potential sensor 2600 and inputs it into an A/D converter 2503. A sensor 2800 detects the position of a tip of an image to be outputted and outputs an image tip signal ITOP. A humidity sensor 2298 and a temperature sensor 2289 respectively detect the humidity and temperature which are required to correct development characteristics. A drive motor for the printer mechanism is indicated by 2285.

In the color LBP 80 having the above arrangement and construction, a host system 300 performs communication with the CPU 3-1 through the external interface circuit 2. For example, the host system 300 specifies the kind of image data to be transferred, and stores the specified information in the RAM 3-3.

Typical examples of combinations of transferred image data are: a combination of R, G and B data and character code data (black or a specified color), a combination of R, G and B data and two-level font data (black or a RGB color), a combination of Y, M, C and BK data and character code data (black or a specified color), and a combination of Y, M, C and BK data and two-level font data (black or a RGB color). The above two-level font data may be replaced with image data which represents tone representation in relatively limited steps more than two steps, for example, color image data produced by computer graphics. The CPU 3-1 controls the DMAC 3-4 to sequentially transfer the R, G and B data to the respective image memories 5–7 and the Y, M, C and BK data to the respective image memories 5–8 by a DMA transfer method.

In the case (A) of the combination of R, G and B data and black character code data, the CPU 3-1 temporarily stores the character code data in the RAM 3-3 and then converts the data into character pattern data in accordance with the font data stored in the ROM 3-2. The CPU 3-1 controls the external interface circuit 2 to electrically connect signal lines 11 and 13 and develop the character pattern data by a bit-map method while incrementing address data on an address line 14.

In the case (B) of R, G and B data and black font data, the CPU 3-1 temporarily stores the black font data in the RAM 3-3 and develops this font data in the BK memory 8 by the bit-map method while incrementing address data on the address line 14 in a manner similar to the above-described manner.

In the case (C) of R, G and B data and character data of a specified color, the CPU 3-1 temporarily stores the character code data into the RAM 3-3, and converts this character code data into character pattern data in accordance with the font data stored in the ROM 3-2. The CPU 3-1 develops this character pattern in the F memory 27 while incrementing address data on the address line 14. The CPU 3-1 separates the character pattern data into multi-level R, G and B data in accordance with the specified color, and the resulting color data are synthesized with the color data stored in the respective R, G and B memories 5, 6 and 7.

In the case (D) of the combination of R, G and B data and multi-level color font data font data containing R, G and B components, the CPU 3-1 temporarily stores these font data into the RAM 3-3, and synthesizes the R, G and B font data with the image data stored in the respective R, G and B memories 5, 6 and 7 while incrementing address data on the address line 14 in a manner similar to the above-described manner. In this synthesis, if any one of the R, G and B font data is data indicating a value other than "0", the CPU 3-1 writes a bit indicating a logic "1" into a corresponding position in the F memory 27.

In the case (E) of the combination of Y, M, C and BK data add black character code data, the CPU 3-1 temporarily stores this character code data into the RAM 3-3, and converts this code data into character pattern data in accordance with the font data stored in the ROM 3-2. Then the CPU 3-1 develops the character pattern data while incrementing address data on the address line 14 in a manner similar to the above-described manner. The CPU 3-1 also converts character pattern data into two kinds of multi-level data (for example, 000H or FFH) and synthesizes the result with the image data stored in the BK memory 8.

In the case (F) of the combination of Y, M, C and BK data and character code data of a specified color, the CPU 3-1 first develops two-level character pattern data in the F memory 27 in a manner similar to the above-described manner. The CPU 3-1 separates this character pattern data into multi-level Y, M, C and BK data in accordance with the specified color and synthesizes the results with the image data stored in the respective image memories 5–8.

The above explanation similarly applies to possible other combinations.

Subsequently, the CPU 3-1 transmits a flag indicative of the completion of data processing to the host system 300. In response to the flag, the host system 300 detects that the printer section 2000 is in a print-enable state, and transmits a print request command. Thus, the CPU 3-1 activates the printer section 2000.

Control Sequence of Control Section 3

Figure 3A:
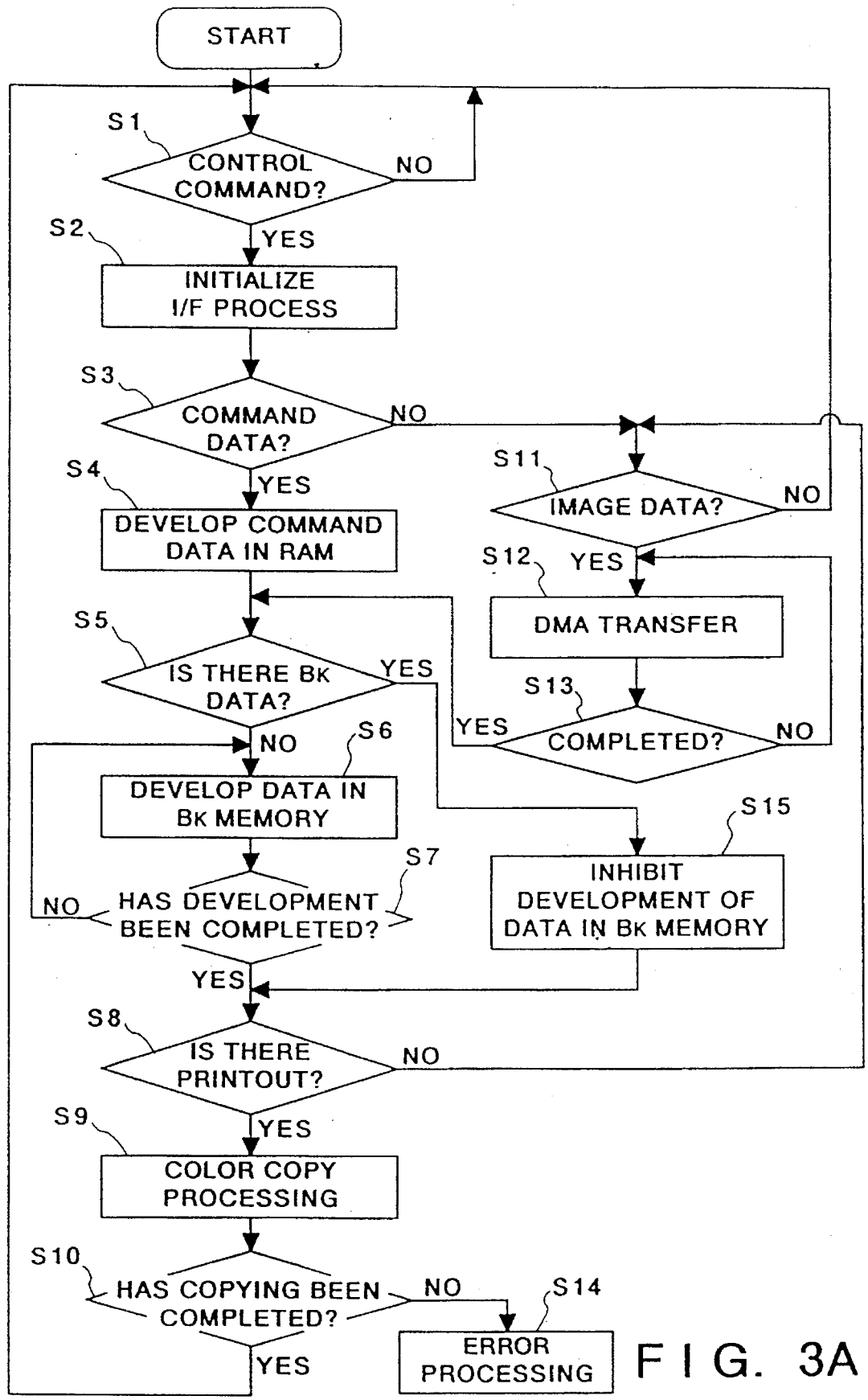

FIG. 3A is a flow chart showing a control sequence according to which the control section 3 of the embodiment provides control without using the F memory 27. In Step S1, the CPU 3-1 waits for the host system 300 to transmit a control command. When the host system 300 transmits the control command, the process proceeds to Step S2, where the CPU 3-1 initializes the interface section 100. At the same time, the CPU 3-1 executes operations such as the setting of γ data and the setting of a UCR coefficient for the image processing circuit 2121 as well as selection between R, G, B image data and Y, M, C, BK image data. The CPU 3-1 also supplies information as to the state of the printer section 2000, for example, the size of paper and the presence or absence of a printer wait state. In Step S3, the CPU 3-1 determines whether there is command data (for example, character code data). If there is no command data, the process proceeds to Step S11, where. the CPU 3-1 determines whether there is image data. If there is image data, the CPU 3-1 effects DMA transfer of the image in Step S12 and then proceeds to Step S13, where it is determined whether the transfer of all the image data (R, G, B or C, M, Y, BK) have been completed. If such transfer has not yet been completed, the process returns to Step S12. If it has been completed, the process proceeds to Step S5.

If command data is detected in the decision of Step S3, the process proceeds to Step S4, where the character code data is temporarily stored in the RAM 3-3. In Step S5, the CPU 3-1 determines whether there is BK data. If there is BK data, the process proceeds to Step S15, where the CPU 3-1 inhibits the development of data in the BK memory 8. If there is no BK data, the process proceeds to Step S6, where the CPU 3-1 develops character pattern data corresponding to the character code data in the BK memory 8. Character pattern data for a maximum of 8 pictures can be developed in the BK memory 8. In Step S7, the CPU 3-1 determines whether such development has been completed. If the development has been completed, the process returns to Step S6; while, if the development has not yet been completed, the process proceeds to Step S8, where the CPU 3-1 makes a decision as to the presence or absence of a print output command. If there is no print output command, the process returns to Step S11. If there is a printout command, the process returns to Step S9, where the CPU 3-1 activates the printer section 2000 over the control line 24 and simultaneously, the synchronizing signal processing circuit 10 over a line 26. In the meantime, the CPU 2110 of the printer section 2000 selects between selectors 904 or 905 and 906 in the image processing circuit 2121 to selectively output color image information corresponding to each individual developed color. In Step S10, the CPU 3-1 determines whether the printing operation has been completed and, if it has been completed, the CPU 3-1 informs the host system 300 of that fact. If the printing operation is not completed within a predetermined time period, the process proceeds to Step S14, where the CPU 3-1 informs the host system 300 of the occurrence of an error. The apparatus can be recovered from error by actuating a reset button (not shown).

FIGS. 3B and 3C are flow charts showing a control sequence which utilizes the F memory 27 of the control section 3 of the embodiment.

In Step S21, the CPU 3-1 waits for the host system 300 to transmit a control command. When the CPU 3-1 receives the control command, the CPU 3-1 determines whether it is an initialize command (Step S22), whether it is a print command (Step S24), whether it is a character-data transfer command (Step S29), and whether it is an image-data transfer command (Step S38). These commands may be transferred as a series of data.

If the control command is an initialize command, the process proceeds to Step S23, where initialization is performed in a manner similar to that used in Step S2 of FIG. 3A. At this time, data representing the designation of R, G and B image data or Y, M, C and BK image data is stored as a flag.

If the control command is a print command, the process proceeds to Step S25, where the CPU 3-1 commands the control section 2500 of the printer section 2000 to start a printing operation. In Steps S26 and S27, the CPU 3-1 waits for the completion of the printing operation. the printing operation is normally completed, the process returns to Step S21, where the CPU 3-1 waits for the next command. If a time-out occurs, the process proceeds to Step S28, where error handling is performed.

If the control command is a character-data transfer command, the process proceeds to Step S30, where a character code is developed as a bit pattern in the ROM 3-2, while font data is developed directly in the RAM 3-3. In Step S31, it is determined whether the image input which was set in Step S23 is RGB-type image data or YMCBk-type image data. In the case of RGB-type image, the process proceeds to Step S32, where it is determined whether the character is a black character or a colored character. In the case of a black character, the process proceeds to Step S33, where a corresponding bit pattern is written into the BK memory 8 as image-area bits. In the case of a colored character, since the BK memory 8 is not utilized in the processing of the printer section 2000, the process proceeds to Step S34, where a corresponding bit pattern is written into the F memory 27. Then, in Step S35, the color of the character is separated into R, G and B color components and they are written into the respective R, G and B memories. In the case of a YMCBK-type image input, since the BK memory 8 is used, the process proceeds to Step S36, where a corresponding bit pattern is written into the F memory 27 as image-area bits. Then, in Step S37, the color of the character is separated into Y, M, C and BK color components and they are written into the respective Y, M, C and BK memories. In the case of image data, the process proceeds to Step S39, where the image data is transferred to the R, G and B memories or the Y, M, C and BK memories by a DMA transfer method. In Step S40, the CPU 3-1 waits for the process to be completed.

Arrangement of BK Memory

Referring to FIG. 4, which is a block diagram showing the BK memory 8 of the embodiment, a decoder 802 decodes the bit-plane selecting signals output from the CPU 3-1 into chip selecting signals CS0–CS7. A selector 801 responds to a select signal from the CPU 3-1 to selectively output one of the chip selecting signals CS0–CS7 output from the decoder 802 or a signal for selecting all the chips simultaneously. Thus, the BK memory 8 can be accessed as a bit-plane memory or an ordinary image data memory.

Arrangement of Image Processing Circuit

Figure 5A:
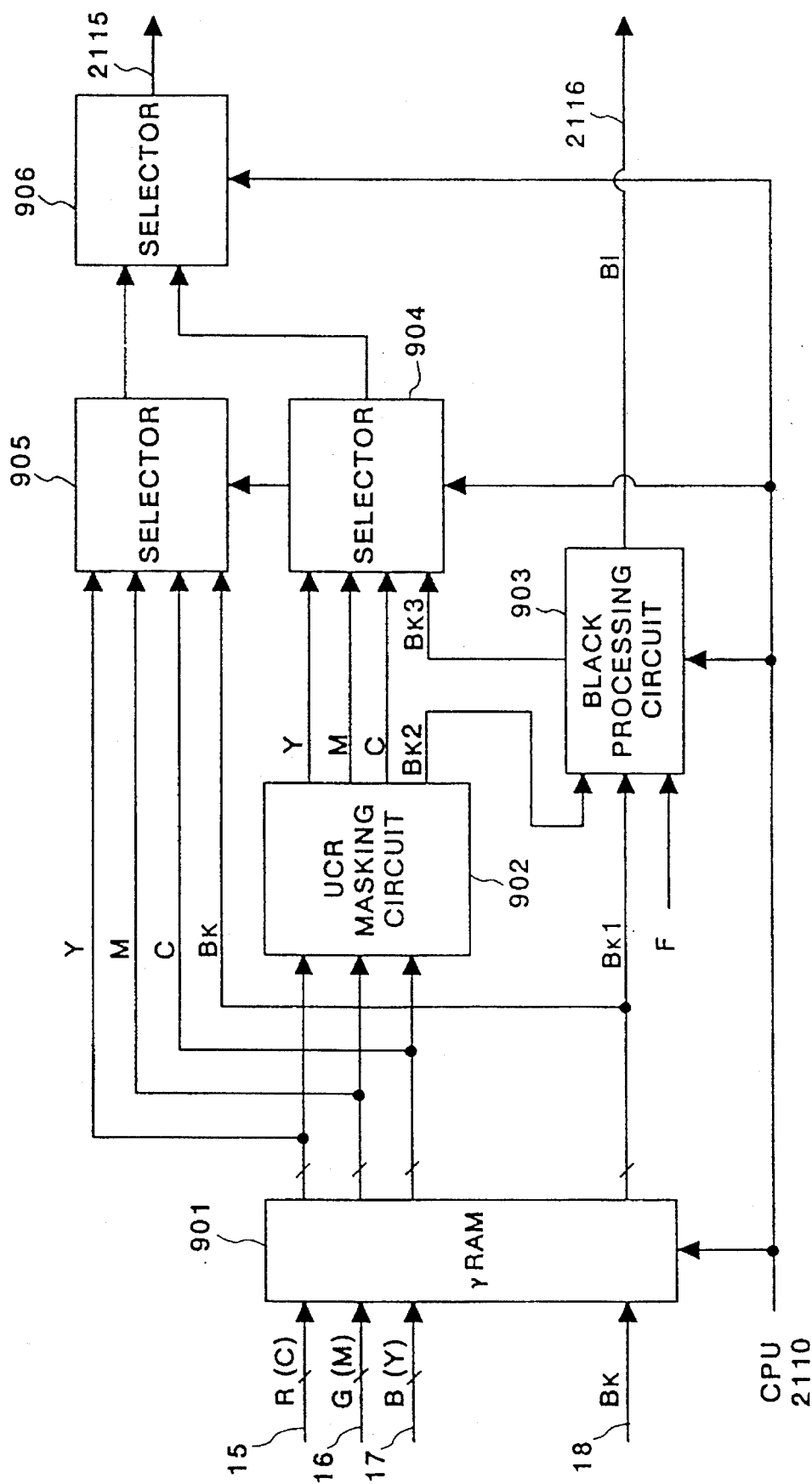
FIG. 5A is a block diagram showing a first example of the image processing circuit of the embodiment.

FIG. 5A is a block diagram showing a first example of the image processing circuit 2121 according to the presently preferred embodiment. In the arrangement shown, a gamma (γ) RAM 901 effects γ conversion of input color image data. The contents of the γ RAM 901 can be set in accordance with an instruction (or γ data) given by the host system 300 (or γ data). For example, if Y, M, C and BK image data are stored in the respective image memories 5–8, the contents of the γ RAM 901 may be of non-conversion characteristics (characteristics in which input and output characteristics are identical to each other). A selector 905 sequentially selects the Y, M, C and BK data output from the γRAM 901 in accordance with developed-color information (in the order Y→M→C→BK) for use in the printer section 2000, and outputs the result through the selector 906. A two-level signal F supplied from the F memory 27 is inputted to a black processing circuit 903 and is then outputted over a line 2116 in the order of the appearance of output pixels. The two-level signal, which is outputted to the line 2116, controls resolution in a printing operation in real time.

When R, G and B data are stored in the respective image memories 5, 6 and 7, the contents of the γRAM 901 are of so-called gamma conversion characteristics (R, G, B→Y, M, C). As is known, various systems utilize different kinds of color materials. For example, toner is used as a color material in the printer section of an electrophotographic system such as the presently preferred embodiment, an ink-jet system utilizes ink, a thermal transfer system utilizes thermal transfer ink, and so on. Since these individual color materials contain different unwanted absorption components, it is not efficient that the host system 300 perform different masking operations for individual printers. For this reason, the image processing circuit 2121 is provided with the UCR masking circuit 902 which performs masking and under color removal of the Y, M, C data output from the γRAM 901 and which generates blacking data BK 2 {=(Y, M, C)$_{min}$}.

Also, if two-level data is stored in the BK memory 8, the contents represent non-conversion characteristics (characteristics in which input and output characteristics are identical to each other), the BK memory 8 outputs two-value pattern data BK 1. The black processing circuit 903 outputs black data BK 3 on the basis of blacking data BK 2 and multi-level data derived from the aforesaid two-level pattern data BK 1. The selector 904 selectively outputs the image data Y, M, C and BK 3 in accordance with the developed-color information for use in the printer section 2000. A serial signal indicative of two-level pattern data BK 1 is outputted to the line 2116.

Figure 5B:
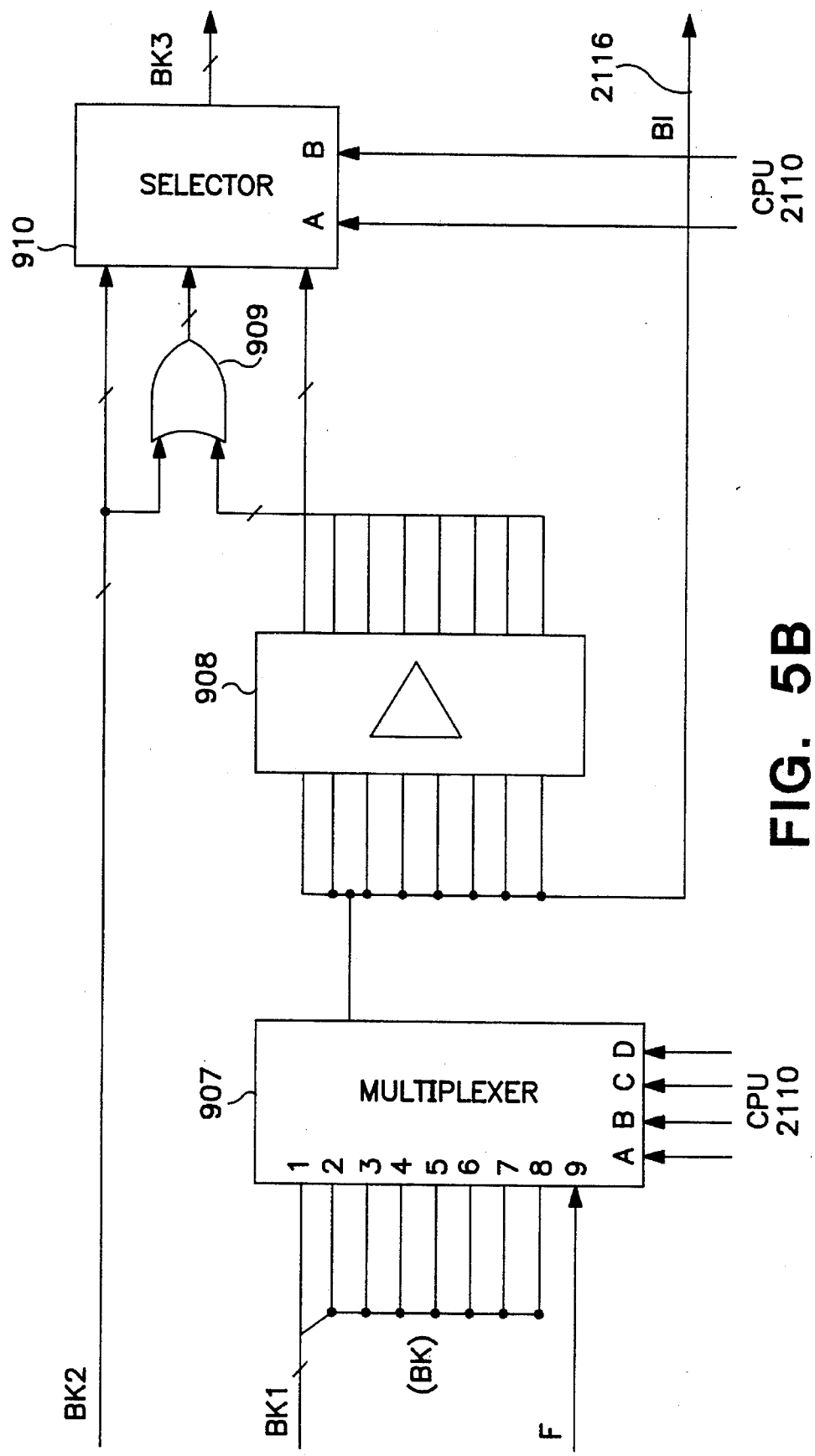
FIG. 5B is a block diagram showing the black processing circuit of the image processing circuit shown in FIG. 5A.

FIG. 5B is a block diagram showing an example of the black processing circuit 903 used in the image processing circuit of FIG. 5A. Referring to FIG. 5B, a multiplexer 907 converts the two-level pattern data BK 1 into a serial two-level signal synchronized with pixel outputs. A buffer 908 converts the series two-level signal output from the multiplexer 907 into multi-level data. For example, when a bit consisting of a two-level signal is at a logic zero, the buffer 908 converts it into multi-level data 00H (H: hexadecimal notation) and, when it is at a logic one, the buffer 908 converts it into multi-level data FFH. An OR circuit 909 for multi-level data effects O-Ring of the blacking data BK 2 and multi-level data (00H or FFH). Thus, the black data BK 3 representative of the portion of a natural image based on R, G and B data which is synthesized with the logic one of character pattern data, is forcibly converted into FFH, thereby effecting image synthesis. The portion of the natural image in which the character pattern data is at the logic zero is printed out as a similar natural image. A selector 910 selects the inputs in accordance with the command of the CPU 2110 and outputs the black data BK 3. For example, if the combination of image data supplied from the host system 300 is that of R, G and B data and black character code data (or black-font data), the selector 910 selects the output of the OR circuit 909. At this time, serially converted two-level pattern data is outputted onto the line 2116 so that it can be used as a selection signal of resolution which will be described later. In the case of any other combination of image data, the multiplexer 907 is controlled by the CPU 2110 so that the F memory 27 can be used, and a signal F output from the multiplexer 907 is used as a selection signal of resolution of the output signal F.

Figure 6A:
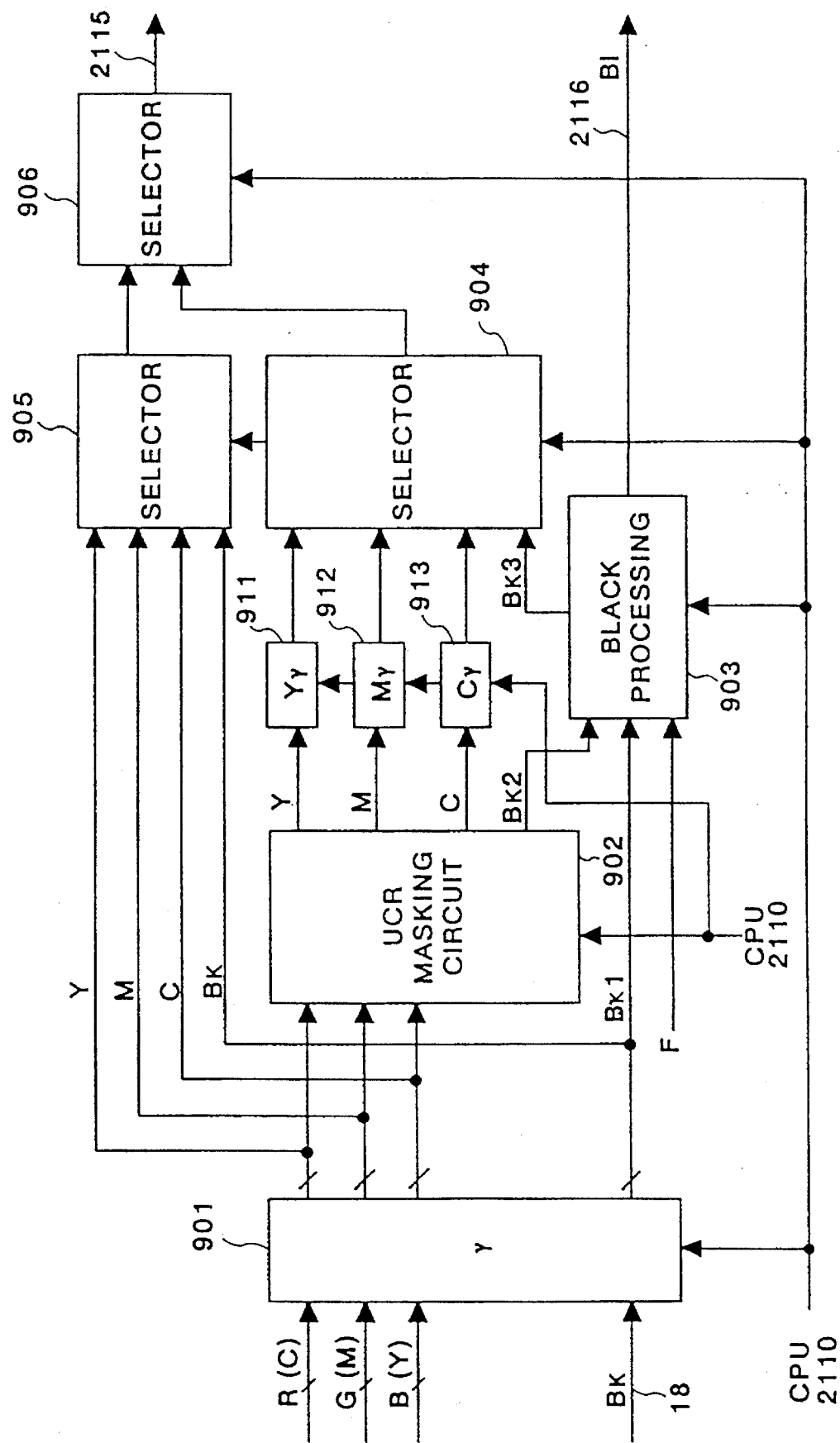
FIG. 6A is a block diagram showing a second example of the image processing circuit of the embodiment.
Figure 6B:
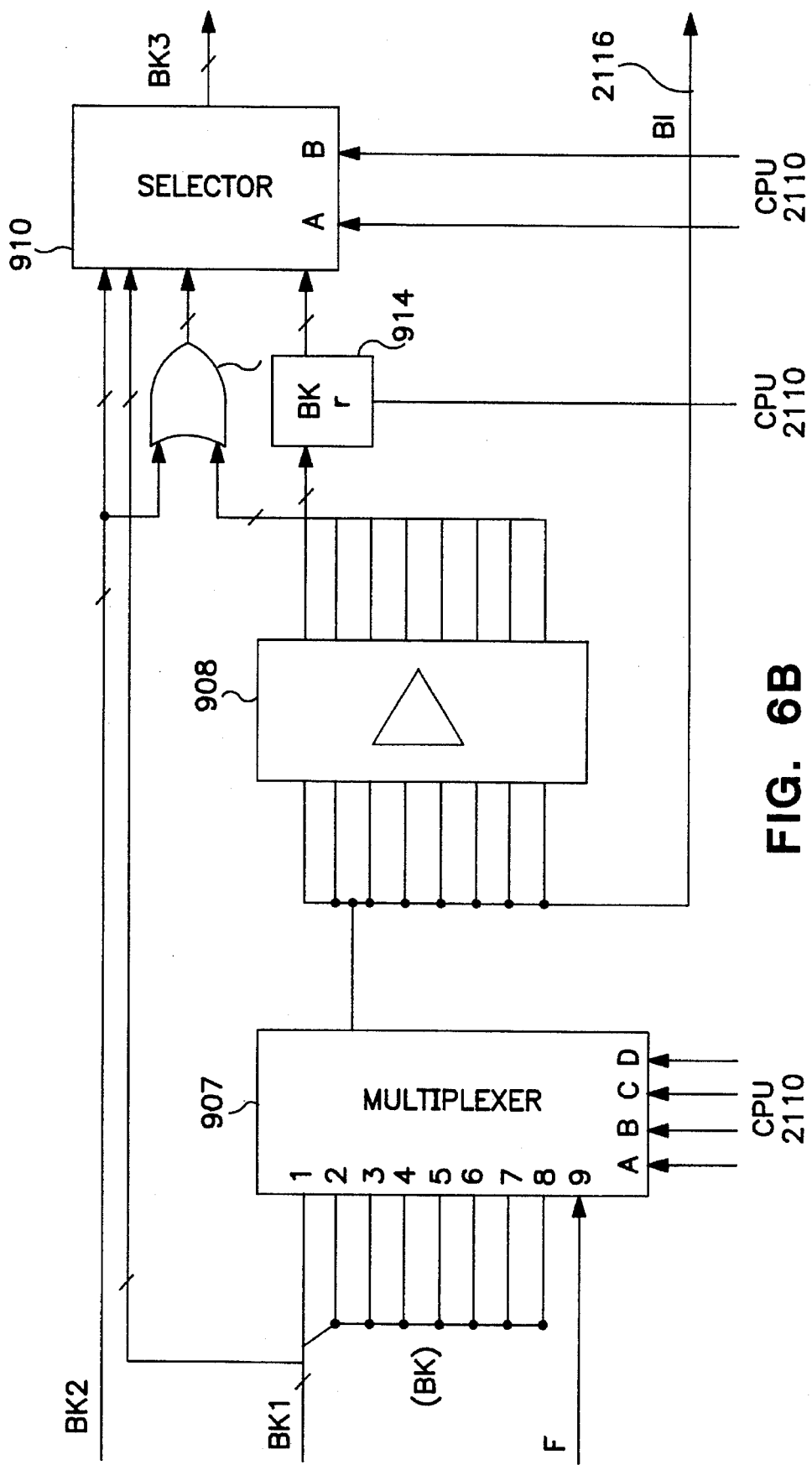
FIG. 6B is a block diagram showing the black processing circuit of the image processing circuit shown in FIG. 6A.

FIG. 6A is a block diagram showing a second example of the image processing circuit of the embodiment, and FIG. 6B is a block diagram showing the black processing circuit of the image processing circuit shown in FIG. 6A. An UCR masking circuit 902 performs matrix and UCR calculations on input image data by using predetermined parameters. The UCR masking circuit 902 is connected to the bus of the CPU 2110 so that the parameters can be set by the CPU 2110. The UCR-calculation part of the CPU 2110 has an arrangement in which parametric values to be multiplied by min (Y, M and C) can be set. In addition, the second example is provided with look-up tables (LUTs) 911–913 for correcting color characteristics and a look-up table (LUT) 914 for correcting black. The CPU 2110 can set an arbitrary curve (conversion characteristic) in each of those LUT's. This arrangement makes it possible to set parameters which match the color materials used in the printer section 2000 and the performance of a fixing roller. For example, if the blacking data BK 2 is corrected, the blacking data BK 2 is substituted for a portion where three colors represented by Y, M and C data are superposed. It is accordingly possible to prevent an unwanted increase in the thickness of a fixed toner layer which may otherwise be experienced with three color toner, whereby the life of a fixing roller can be improved. Although three Y, M and C toner layers tend to be easily scattered, if these three layers are replaced by one BK-toner layer, it is possible to prevent the toner from being scattered.

Figure 7:
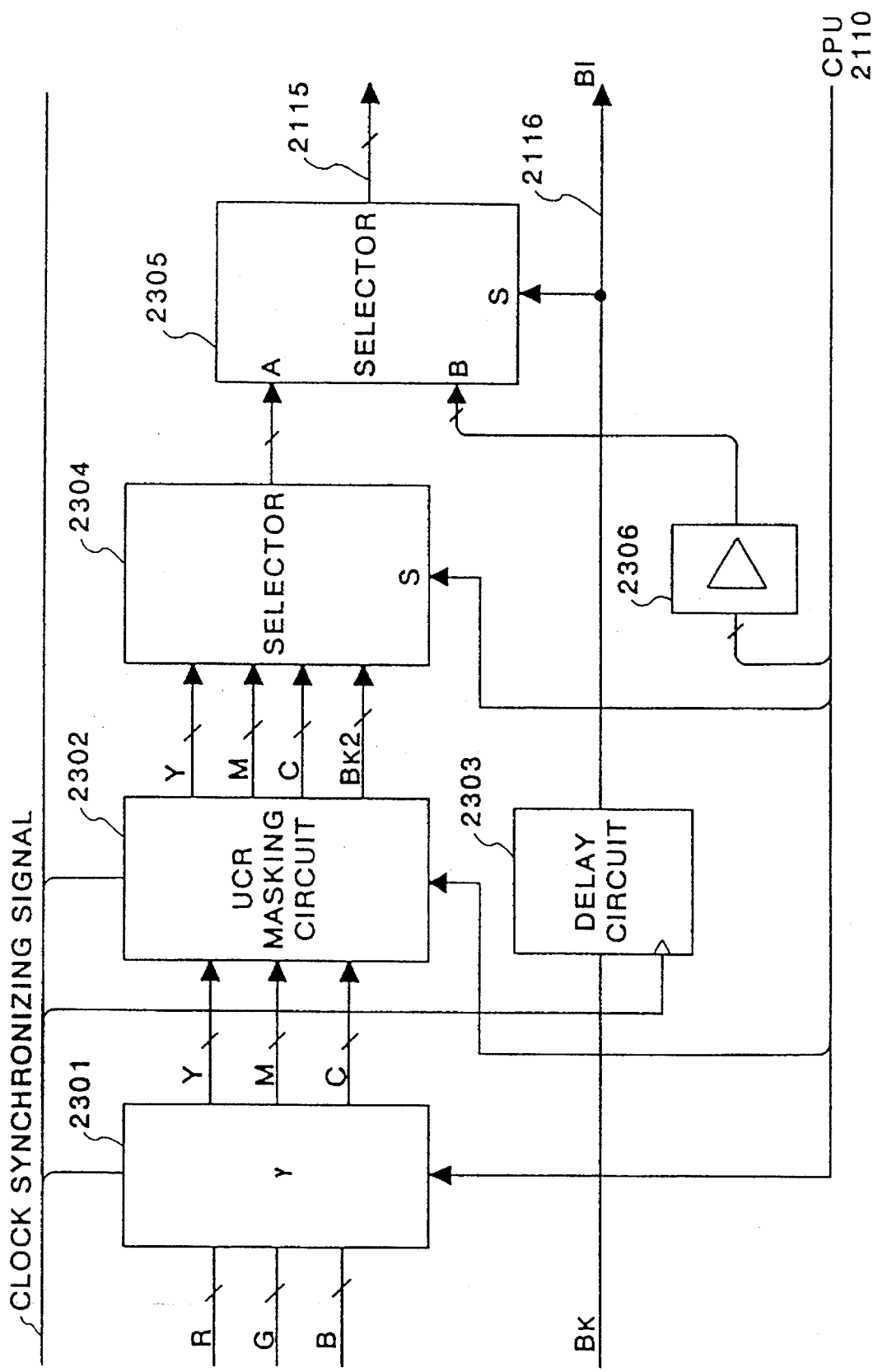
FIG. 7 is a block diagram showing a third example of the image processing circuit of the embodiment.

FIG. 7 is a block diagram showing a third example of the image processing circuit 2121 of the embodiment. Referring to the drawing, a gamma (γ) correcting circuit 2301 converts R, G and B data into Y, M and C data (8 bits for each) which match the output characteristics of the printer section 2000. A masking/UCR circuit 2302 corrects the color characteristics of the Y, M and C data in accordance with the color material (toner) used in the printer section 2000, and generates the blacking signal BK 2. A selector 2304 sequentially selectively outputs Y, M, C and BK data in accordance with the developed-color information (for example, the order Y→M→C→BK) for use in the printer section 2000.

A delay circuit 2303 delays two-level data supplied from the BK memory by the amount of delay which results from the processing of the BK data in the masking/UCR circuit 2302. An encoder 2306 converts a specifying code (for example, a code 01H) supplied from the CPU 2110 into multi-level data (for example, black data FFH) in accordance with the command supplied from the control section 3. The CPU 2110 generates various kinds of specifying codes and, the encoder 2306 converts such specifying data into predetermined multi-level data by decoding and outputs the result to a selector 2305. The selector 2305 switches inputs provided at terminals A and B in accordance with data supplied from the delay circuit 2303 over the line 2116. More specifically, if Y, M and C data is sent, the selector 2305 selects the input at the terminal A. In the case of BK 2 data, if the data output from the delay circuit 2303 is at the logic zero, the selector 2305 selects the input at the terminal A (BK 2 data), while if that data is at the logic one, the selector 2305 selects the input at the terminal B (the output from the encoder 2306). In this manner, the BK 2 data based on the R, G and B data and the black data FFH based on the BK data are synthesized with each other, and the result is outputted onto the line 2115.

Figure 8:
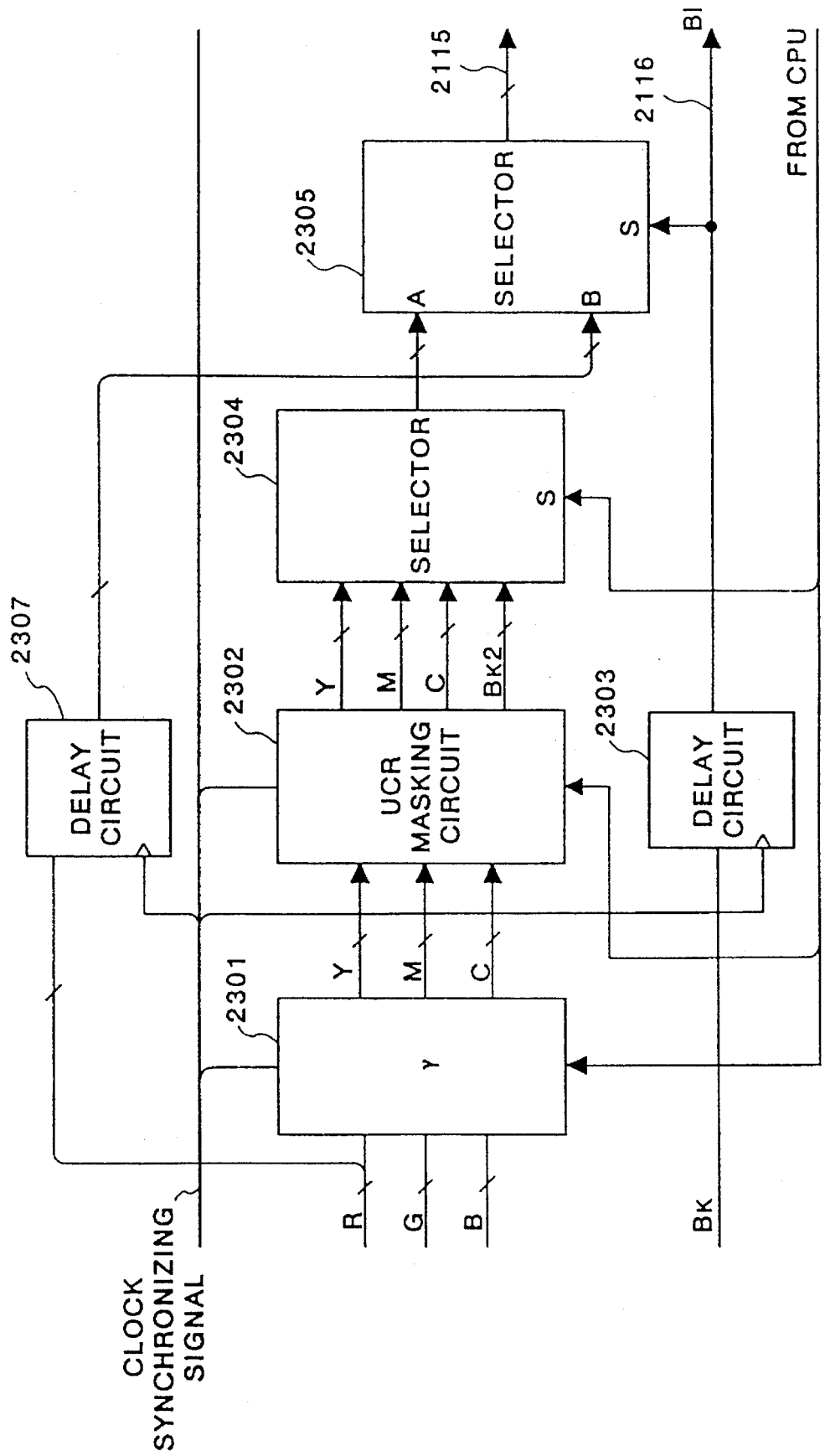
FIG. 8 is a block diagram showing a fourth example of the image processing circuit of the embodiment.

FIG. 8 is a block diagram showing a fourth example of the image processing circuit of the embodiment. The same reference numerals are used to denote elements which are the same as those shown in FIG. 7, and explanation is omitted. The embodiment is arranged to transfer multi-level data corresponding to BK data by utilizing a line for R data. More specifically, if the BK data is at the logic one, the output black data may be multi-level data corresponding to the BK data irrespective of the BK 2 data (that is, original R, G and B data). For this reason, if the BK data is at the logic zero, the original R data is supplied to the line for R data, while if it is at the logic one, multi-level data corresponding to the BK data is supplied to that line. The line for R data leads to a delay circuit 2307 as well as the gamma (γ) correcting circuit 2301. After the contents of R data have been delayed by the delay circuit 2307, the result is supplied to the terminal B of the selector 2305. In this manner, multi-level data corresponding to the BK data can be determined for each pixel.

It is to be noted that each of the image processing circuits shown as the third and fourth examples has an arrangement which can achieve satisfactory resolution without writing image data into a special image memory in the interface section 100. Accordingly, the third or fourth example may be synthesized with the first or second example.

Arrangement of Tone Control Circuit

Figure 9:
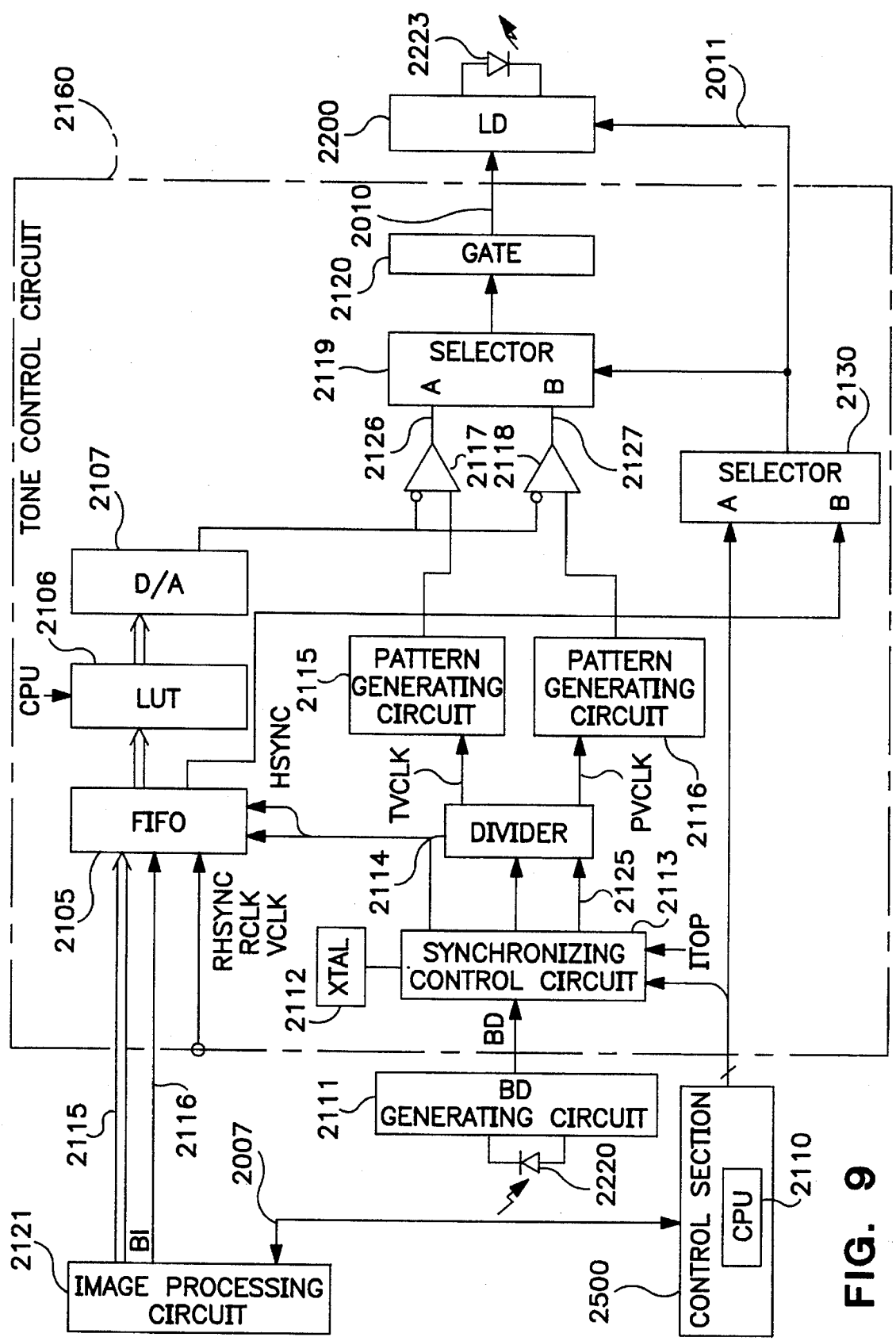
FIG. 9 is a block diagram showing the tone control circuit of the embodiment.

FIG. 9 is a block diagram showing the tone control circuit 2160 used in the embodiment. Referring to the drawing, the image processing circuit 2121 outputs Y, M, C and BK data (eight bits for each) onto the line 2115 in the order of developed-color information for use in the printer section 2000. The output data is written into a buffer memory (FIFO) 2105 of the interface section 100 in accordance with a horizontal synchronizing signal (RHSYNC) and a video clock signal (RCLK). The data is read from the buffer memory (FIFO) 2105 in accordance with a horizontal synchronizing signal (HSYNC) and a video clock signal (CLK) which are output from a synchronizing control circuit 2113. Thus, the interface section 100 and the printer section 2000 are synchronized with each other.

The Y, M, C and BK image data read from the buffer memory 2105 are inputted into a γRAM (LUT) 2106. The LUT 2106 corrects the density of an image conveyed by the input image data linearly with respect to the output characteristics of the printer section 2000. The image data output from the LUT 2106 is converted into an analog signal (video signal) by a D/A converter 2107, and are then supplied to one terminal of each comparator 2117 and 2118. Supplied to the other terminal is an analog pattern signal for effecting binarization (pulse width modulation) of the video signal in accordance with the density of the video signal. In the illustrated arrangement, since the comparator 2117 reproduces line drawings such as characters and figures, resolution is important in terms of line-drawing reproduction. Therefore, the frequency of the analog pattern signal is set to be equal to, for example, that of the video signal (400 lines in the embodiment) and one pattern signal is made to correspond to a video signal for one pixel. On the other hand, the comparator 2118 reproduces a half-tone image such as a natural image. Since increased tone reproducibility is needed to reproduce the half-tone image, the frequency of the analog pattern signal is set to be half of the frequency of the video signal (200 lines in the embodiment) and one pattern signal is made to correspond to video signals for two pixels.

Referring to the illustrated circuit arrangement, a HSYNC signal is obtained in synchronization with a BD signal output from the BD detecting circuit 2111. The synchronizing control circuit 2113 receives the BD signal, a master clock signal (having a frequency four times as high as a video clock signal VCLK) supplied from a crystal oscillator (XTAL) 2112, and a vertical synchronizing signal (ITOP) for establishing synchronization in the sub-scan direction, thereby establishing synchronization among the HSYNC SIGNAL, the ITOP signal and the VCLK signal. Clock signals 2124 and 2125 for pattern generation are also synchronized with the ITOP signal and the HSYNC signal. The clock signal 2124 has a frequency twice as high as the video signal, and the clock signal 2125 has the same frequency as the video signal. A frequency divider 2114 divides the respective clock signals 2124 and 2125 by two and outputs clock signals TVCLK and PVCLK each having a 50% duty ratio. The clock signals TVCLK and PVCLK are inputted into the respective pattern generating circuits 2115 and 2116, whereby predetermined analog pattern signals are generated. In the embodiment, analog pattern signals having triangular waveforms are generated.

An analog video signal output from a D/A converter 2107 is compared with the analog pattern signals in the respective comparators 2117 and 2118. The comparators 2117 and 2118 supply PWM signals 2126 and 2127 each having a pulse width corresponding to the density represented by the analog video signal to a selector 2119.

Simultaneously, BI data output from the image processing circuit 2121 is written into the buffer memory 2105. The BI data is then read from the buffer memory 2105 and inputted into a selector 2130. Normally, a selector 2130 is controlled by the CPU 2110 so that the BI data provided at a terminal B is selected, and the corresponding output is supplied to the selecting terminal of the selector 2119. Thus, if the BI data is at the logic one, the selector 2119 selects the input at the terminal A (high-resolution PWM signal) and the input at the terminal B (low-resolution PWM signal). Accordingly, the selector 2119 outputs a PWM signal of low resolution and good tone representation with respect to an image represented by the original R, G and B data, and a high-resolution PWM signal with respect to a portion in which the BI data is synthesized. A gate circuit 2120 provides matching with a printing area by passing PWM signals with respect to specific areas on printing paper. The output of the gate 2120 is input into the laser driver (LD) 2200, whereby the semiconductor laser device 2223 is driven by a constant current during a time period corresponding to the pulse width of the PWM signal. Simultaneously, the BI signal output from the selector 2130 is inputted into the LD 2200, whereby the power (constant current driving value I) of the laser light is controlled.

FIG. 10 is a timing chart showing primary signals used in the embodiment. The XTAL 2112 inputs a clock signal (SCLK) having a frequency twice that of the VCLK signal into the synchronizing control circuit 2113 which, in turn, outputs predetermined signals such as HSYNC and VCLK signals which are synchronized with the BD signal and the SCLK signal. Blanking signals are formed by a counter (not shown) which is reset by the falling edge of the BD signal and which measures a time period shorter than the period of the BD signal.

Arrangement of Laser Driver

Figure 11B:
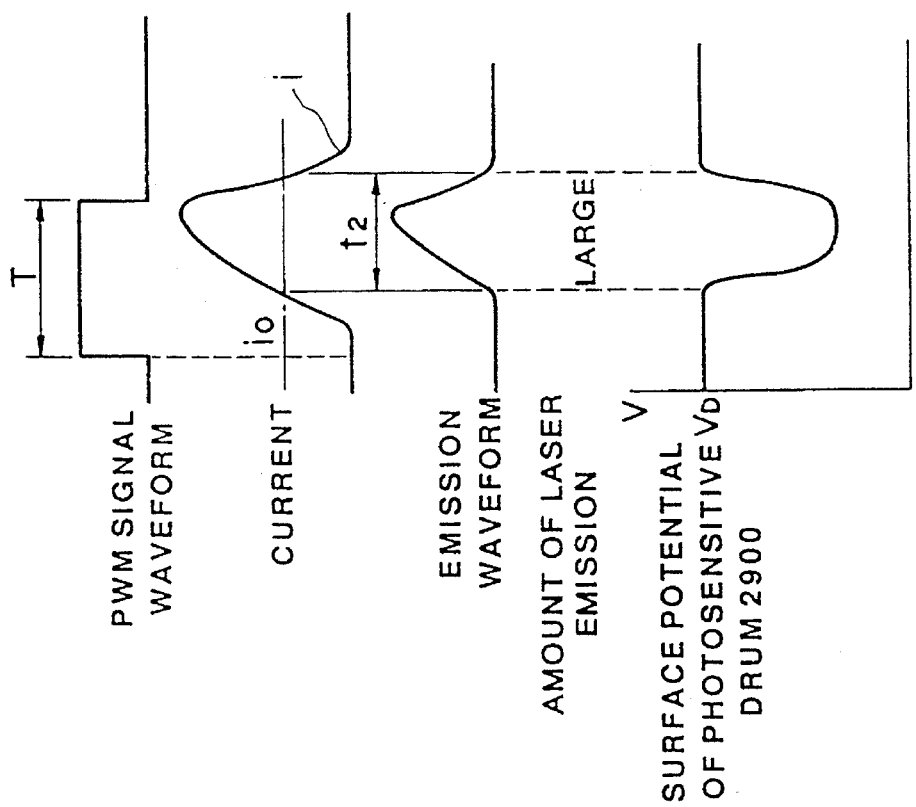
FIGS. 11A and 11B are charts showing the relationship between PWM signal and laser driving current in the embodiment.
Figure 11A:
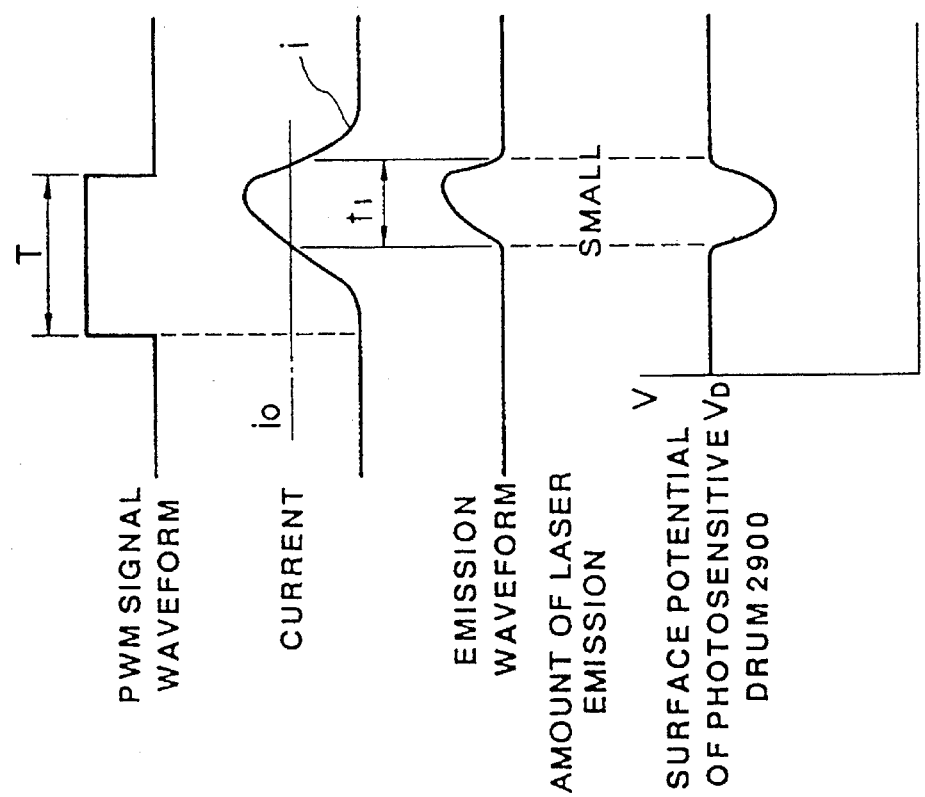

FIG. 11A and FIG. 11B are charts showing the relationship between PWM signal and laser driving current in the embodiment. As illustrated, even if each PWM signal has the same pulse duration T, the rise of current i which flows in the laser diode 2223 greatly depends upon the magnitude of the constant driving current I. When the current i reaches a predetermined threshold io, emission of laser light is started. Accordingly, if the PWM signal having the same pulse width T is driven, as the laser driving constant current I varies, the amount of laser emission also varies as shown in FIGS. 11A and 11B. The exposure potential of the surface of a photosensitive drum which is uniformly charged with a potential $V_D$ is also varied as shown with the variation in the amount of laser emission.

The C, M, Y and BK data based on the original R, G and B data are pulse-width-modulated into low-resolution signals (for 200 lines) so that these data can be adapted to half-tone representation. The BK data based on the original two-level data read from the BK or F memory is pulse-width-modulated into a high-resolution signal (400 lines) so that it can be adapted to the reproduction of line drawings. For this reason, when the two-level data is to be reproduced, it is preferable that the laser driving current I be set to a somewhat large value so as to obtain sharp reproduction characteristics. However, if the laser driving current I is set to such a large value, the amount of emission will be excessive with respect to the reproduction of low-resolution R, G and B data and an image with impaired tone will be outputted. If the laser driving current I is set to a somewhat small value, the tone representation derived from the R, G and B data will be improved, but the sharpness of an image corresponding to the two-level data will be impaired. If a sufficient amount of laser emission is not obtained, thin lines cannot be satisfactorily reproduced. For these reasons, the present apparatus is arranged to switch the laser driving current I in accordance with the above-described natures of various images.

Figure 12:
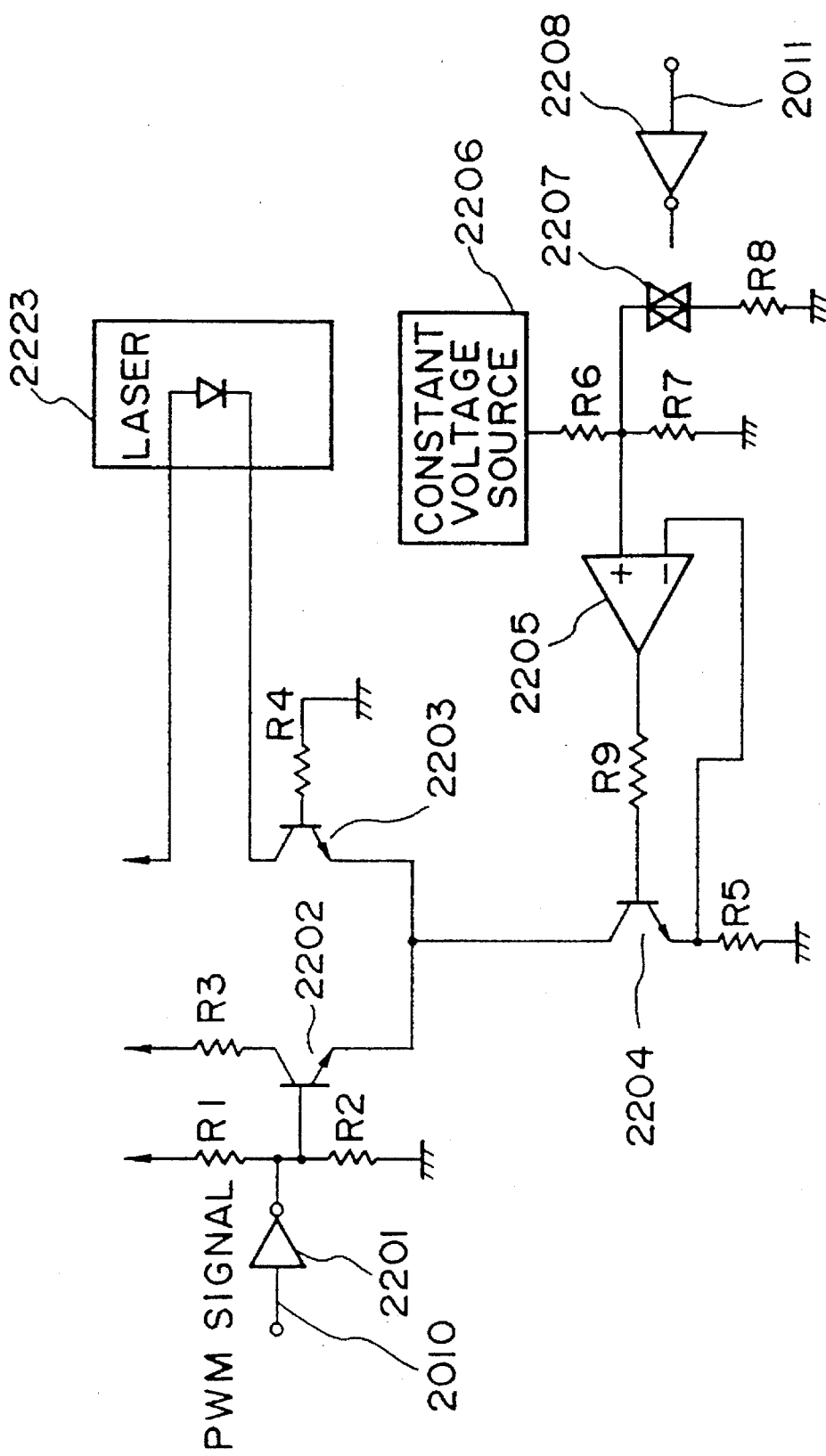
FIG. 12 is a circuit diagram showing a first example of the laser driver of the embodiment.

FIG. 12 is a circuit diagram showing a first example of the laser driver 2200 according to the embodiment. As illustrated, transistors 2202 and 2203 constitute a current switching circuit. A PWM signal 2010 outputted from the gate circuit 2120 is level-inverted by a buffer circuit 2201 and inputted to the base of the transistor 2202. Thus, if the PWM signal 2010 is at the logic one, current is supplied to a laser diode 2223, while, if the PWM signal is at the logic zero, no current is supplied to the laser diode 2223. A transistor 2204 and an operational amplifier 2205 constitute a constant current source circuit to determine the constant driving current I to be supplied to the laser diode 2223. More specifically, the output voltage of the constant voltage source 2206 is divided by resistors R6 and R7 to form a first voltage $V_1$. At this time, the transistor 2204 supplies a constant current of approximately $I=V_1/R5$ to a current switching circuit.

A BI signal 2010 output from the selector 2130 serves to selectively turn on and off an analog switch 2207 through an inverter 2208. When the BI signal is at the logic one, the analog switch 2207 is opened to supply the aforesaid constant current of $I=V_1/R5$ to the current switching circuit. However, if the BI signal is at the logic zero, the analog switch 2207 is closed to form a second voltage $V_2$. The transistor 2204, in turn, supplies a constant current of approximately $I=V_2/R5$ to the current switching circuit. In this manner, it is possible to vary driving power to be applied to the laser diode 2223.

FIG. 13 is a circuit diagram showing a second example of the laser driver 2200 according to the embodiment. In FIG. 13, the same reference numerals are used to denote elements which are the same as those shown in FIG. 12. In the circuit shown in FIG. 13, the CPU 2110 supplies input data to a D/A converter 2210 so that laser driving constant current can be arbitrarily set. Accordingly, it is possible to form high-quality images corresponding to the natures of individual images.

Although the above embodiment has been explained with reference to the laser beam printer, the present invention is not limited to such an application. For example, if the present invention is applied to ink-jet printers or thermal printers, it is of course possible to acheive advantages similar to the above-described ones.

Although the above embodiment has been explained with referenct to the four colors Y, M, C and BK, the present invention is not limited to such colors. For example, the developer used in the printer section may be composed of three colors Y, M and C.

A method of binarizing the density of an image is not limited to pulse width modulation, and a dither method may also be employed.

Although the above explanation of the embodiment refers to a specific arrangement in which image data supplied over two lines are synthesized, this arrangement is not an exclusive arrangement. For example, two-level image data corresponding to specific multi-level image data may be used as resolution-switching data only. More specifically, refering to FIG. 4, if control is set so that signals over the line 2116 are utilized as resolution selecting signals, while the multi-level data output from the encoder 908 are always set to zero, two-level image data are not synthesized in a substantial sense. Accordingly, since multi-level data and corresponding two-level data (resolution selecting signal) can be prepared in the host system, it is possible to exercise flexible and fine control over resolution.

In accordance with the present invention described above, it is possible to easily form a high-quality image from a multi-level image and a two-level image such as a character or a figure, and loads applied to host systems can be greatly reduced.

In accordance with the present invention, it is possible to effectively synthesize images by means of a simple image interface.

Furthermore, in accordance with the present invention, it is possible to clearly form line drawings and a natural image with excellent tone representation, whereby image quality can be further improved.

While the invention has been described with reference to a specific embodiment and examples, this description is solely for the purpose of illustration and is not to be construed as limiting the scope of the invention claimed below. On the contrary, various alterations, modifications and additions may be made without departing from the true scope and spirit of the invention as defined by the appended claims.

What is claimed is:

1. A method for forming an image at different degrees of resolution, comprising the steps of:
   converting image data into a two-level signal according to a density which corresponds to the image data;
   forming the image in accordance with the two-level signal; and
   varying driving power for driving an image forming means in accordance with the different degrees of resolution.

2. An image processing method for use in an image processing apparatus connected with an image forming apparatus for forming an image at different degrees of resolution, comprising the steps of:
   inputting image data from an external source;
   generating a control signal to control a degree of resolution at which the image forming apparatus forms the image, wherein the control signal controls a driving power of the image forming apparatus; and
   outputting the image data input in said inputting step and the control signal to the image forming apparatus.

3. An image forming method for forming an image at plural degrees of resolution, comprising the steps of:
   inputting image data;
   forming the image based on the image data; and
   controlling driving power of an image forming means for forming the image in accordance with a degree of resolution.

4. An image forming apparatus for forming an image at different degrees of resolution, comprising:
   binarizing means for converting image data into a two-level signal according to a density which corresponds to said image data;
   image forming means for forming the image in accordance with said two-level signal; and
   varying means for varying driving power for driving said image forming means in accordance with said different degrees of resolution.

5. An image forming apparatus according to claim 4, wherein said image forming apparatus is a laser beam printer for forming the image by using a laser beam generated with a predetermined cycle.

6. An image forming apparatus according to claim 5, wherein said different degrees of resolution correspond to predetermined cycles of the laser beam printer and are controlled by changing said predetermined cycles.

7. An image processing apparatus connected with an image forming apparatus which forms an image at different degrees of resolution, comprising:
   input means for inputting image data from an external source;
   generating means for generating a control signal to control a degree of resolution at which said image forming apparatus forms the image from the image data, wherein said control signal controls a driving power of said image forming apparatus; and
   output means for outputting the image data input by said input means and the control signal to said image forming apparatus.

8. An image processing apparatus according to claim 7, wherein said image forming apparatus is a laser beam printer forming the image by using a laser beam.

9. An image processing apparatus according to claim 7, wherein said image forming apparatus includes pulse-width modulation means for generating a pulse-width modulation signal by comparing the image data with a pattern signal having a predetermined period.

10. An image processing apparatus according to claim 9, wherein the control signal is a signal to control a period of the pattern signal.

11. An image forming apparatus for forming an image at plural degrees of resolution, comprising:
    input means for inputting image data;
    image forming means for forming the image based on the image data; and
    control means for controlling driving power of said image forming means in accordance with a degree of resolution.

12. An image forming apparatus according to claim 11, wherein said image forming means is a laser beam printer for forming the image by using a laser beam generated with a predetermined cycle.

13. An image forming apparatus according to claim 12, wherein the degree of resolution corresponds to said predetermined cycle of the laser beam printer and is controlled by changing said cycle.

14. An image forming apparatus according to claim 11, wherein said image forming means is a laser beam printer for forming the image by using a laser beam.

* * * * *

UNITED STATES PATENT AND TRADEMARK OFFICE
CERTIFICATE OF CORRECTION

PATENT NO. : 5,574,563

DATED : November 12, 1996

INVENTORS : Kimiyoshi Hayashi, et al.

Page 1 of 2

It is certified that error appears in the above-identified patent and that said Letters Patent is hereby corrected as shown below:

FACE PAGE:

[56] Insert the following:

```
--4,686,579    8/1987    Sakamoto ..........   358/298 X
  4,847,641    7/1989    Tung .............   346/160 X
  4,949,188    8/1990    Sato .............   358/448
  4,958,219    9/1990    Kadowaki ..........   358/75
  4,963,898   10/1990    Kadowaki, et al. ..   346/157
  5,041,915    8/1990    Hirota, et al. ....   358/400
  5,045,869    9/1990    Isaka, et al. .....   346/108--
```

COLUMN 1:

Line 5, "continuation" should be deleted.

UNITED STATES PATENT AND TRADEMARK OFFICE
CERTIFICATE OF CORRECTION

PATENT NO. : 5,574,563

DATED : November 12, 1996

INVENTORS : Kimiyoshi Hayashi, et al.

It is certified that error appears in the above-identified patent and that said Letters Patent is hereby corrected as shown below:

COLUMN 8:

Line 27, "iS" should read --is--.

Signed and Sealed this

Fifteenth Day of April, 1997

Attest:

BRUCE LEHMAN

Attesting Officer

Commissioner of Patents and Trademarks